(12) United States Patent
Nakagawa et al.

(10) Patent No.: US 6,601,766 B2
(45) Date of Patent: *Aug. 5, 2003

(54) ELECTRONIC DEVICE USING CARD-TYPE MEDIA

(75) Inventors: Yoshio Nakagawa, Sakai (JP); Daigo Yoshioka, Toyonaka (JP); Hisanori Itoh, Osaka (JP); Naohiko Hayashi, Sakai (JP); Shoichi Minato, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/745,309

(22) Filed: Dec. 21, 2000

(65) Prior Publication Data

US 2001/0006401 A1 Jul. 5, 2001

(30) Foreign Application Priority Data

Dec. 24, 1999 (JP) .......................................... 11-367304

(51) Int. Cl.[7] .................................................. G06K 7/08
(52) U.S. Cl. ...................... 235/451; 235/480; 235/483; 348/231.3; 348/231.6
(58) Field of Search ............................... 235/451, 375, 235/487, 492; 348/207, 373, 374, 376

(56) References Cited

U.S. PATENT DOCUMENTS

| 5,299,089 A | * | 3/1994 | Lwee ........................ 361/684 |
| 5,559,672 A | * | 9/1996 | Buras, Jr. et al. ............ 361/684 |
| 5,790,193 A | | 8/1998 | Ohmori ....................... 348/375 |
| 5,805,219 A | * | 9/1998 | Ejima et al. ................. 348/375 |
| 5,907,354 A | * | 5/1999 | Cama et al. ................. 348/373 |
| 6,104,430 A | | 8/2000 | Fukuoka ...................... 348/232 |
| 6,120,322 A | * | 9/2000 | Ho et al. .................... 439/541.5 |

FOREIGN PATENT DOCUMENTS

| JP | 10-023365 A | 1/1998 |
| JP | 10-042231 A | 2/1998 |

* cited by examiner

*Primary Examiner*—Michael G. Lee
*Assistant Examiner*—Ahshik Kim
(74) *Attorney, Agent, or Firm*—Sidley Austin Brown & Wood LLP

(57) ABSTRACT

Openings (OPa, OPb) corresponding to respective card slots (18a, 18b) are formed in a side face of a digital camera, and a slot cover (121) having a size covering both of the openings (OPa, OPb) is placed in a manner so as to shift thereon, thereby allowing either of the openings of the card slots to be selectively exposed. A CPU, installed therein, is allowed to access a card-type medium attached to the card slot that is not exposed, and is not allowed to access a card-type medium attached to the card slot that is exposed. A card-type medium can be detachably attached to the card slot that is exposed, and with respect to the card slot that is not exposed, the attaching and removing operations of a card-type medium are restricted.

9 Claims, 23 Drawing Sheets

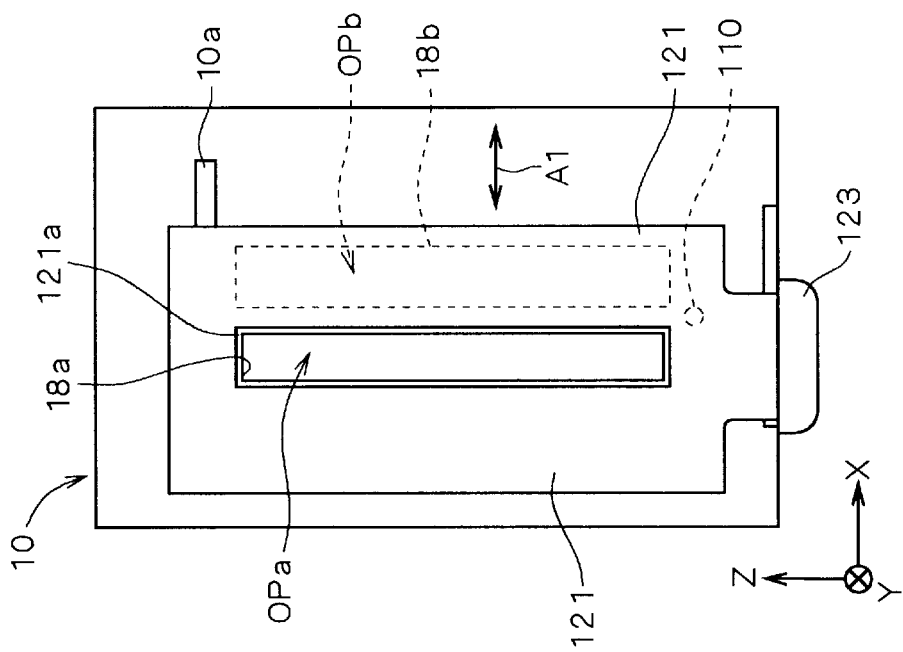
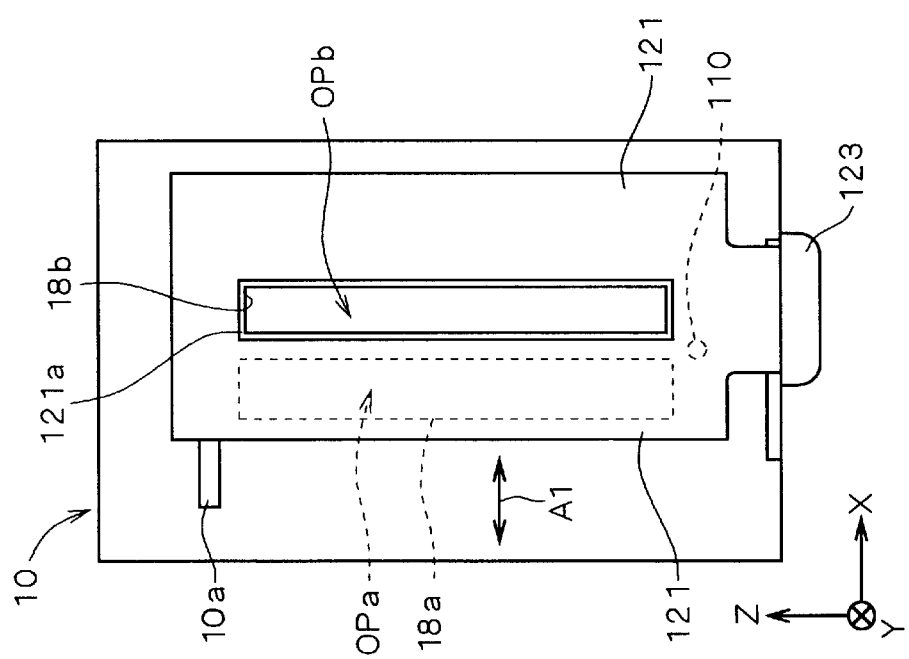

F I G. 12A
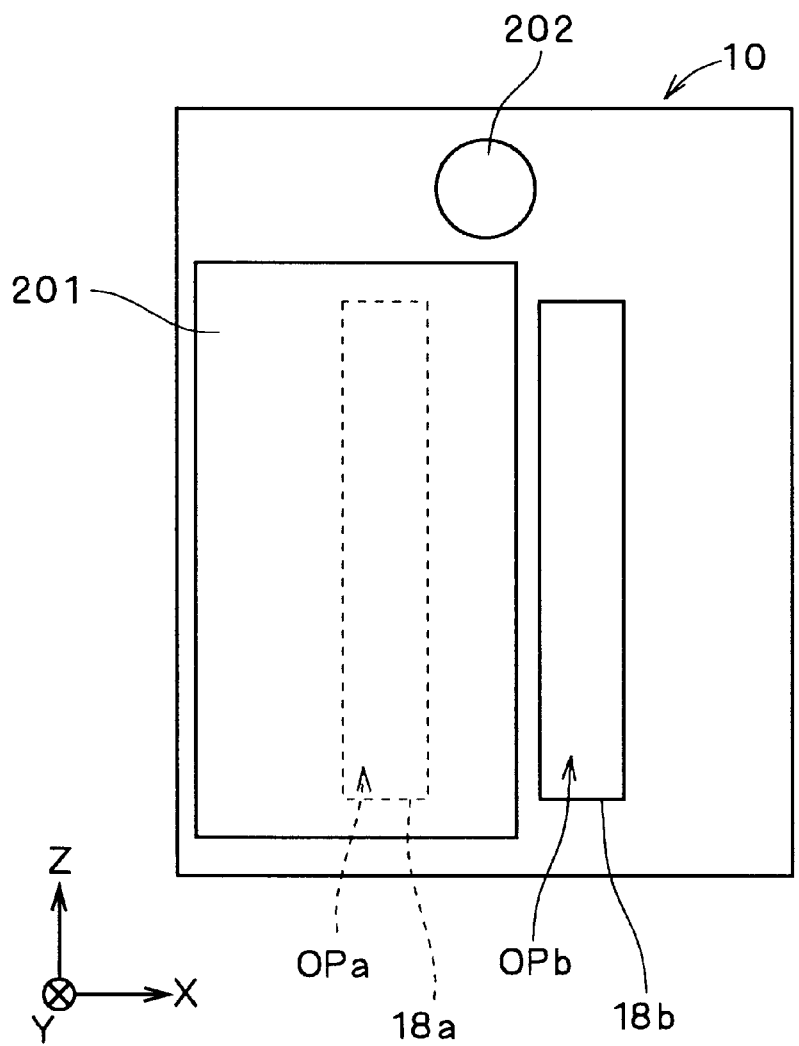

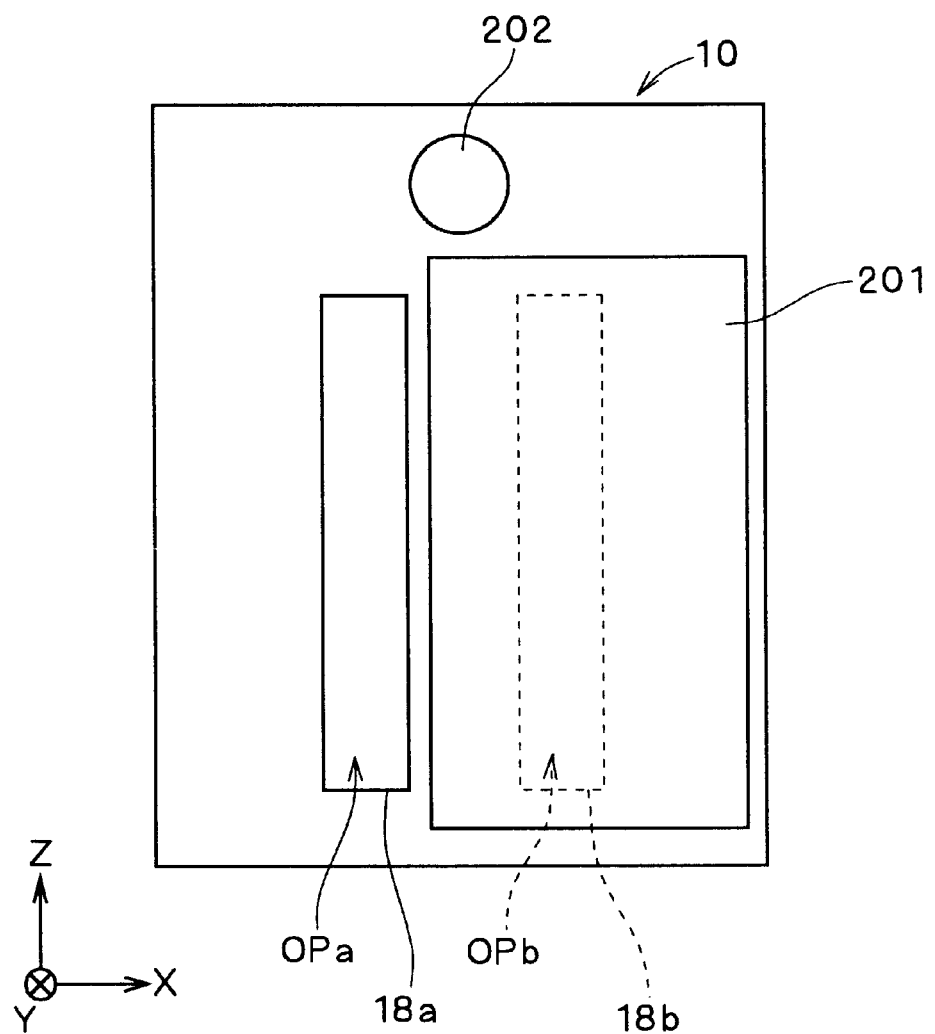

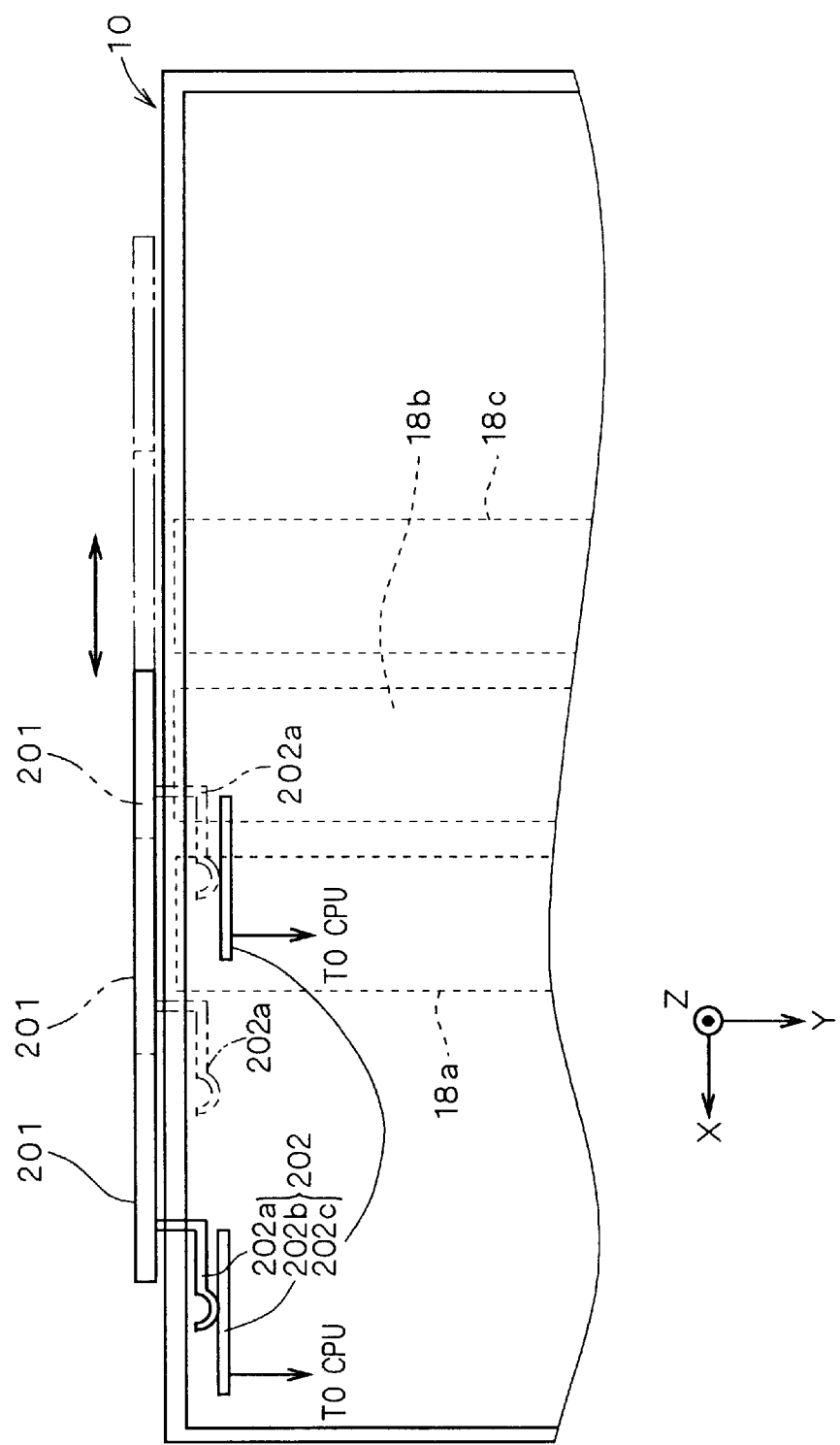

FIG. 14
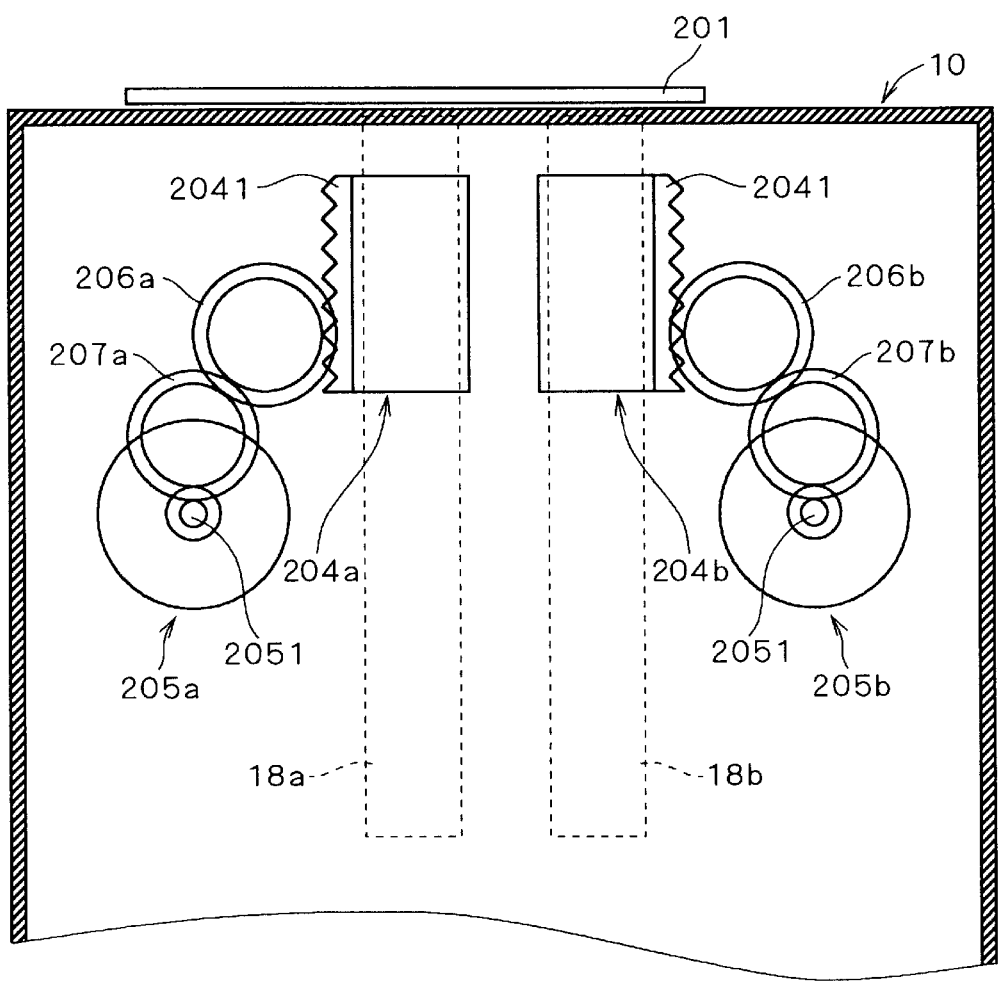
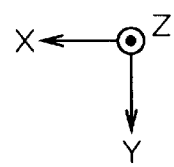

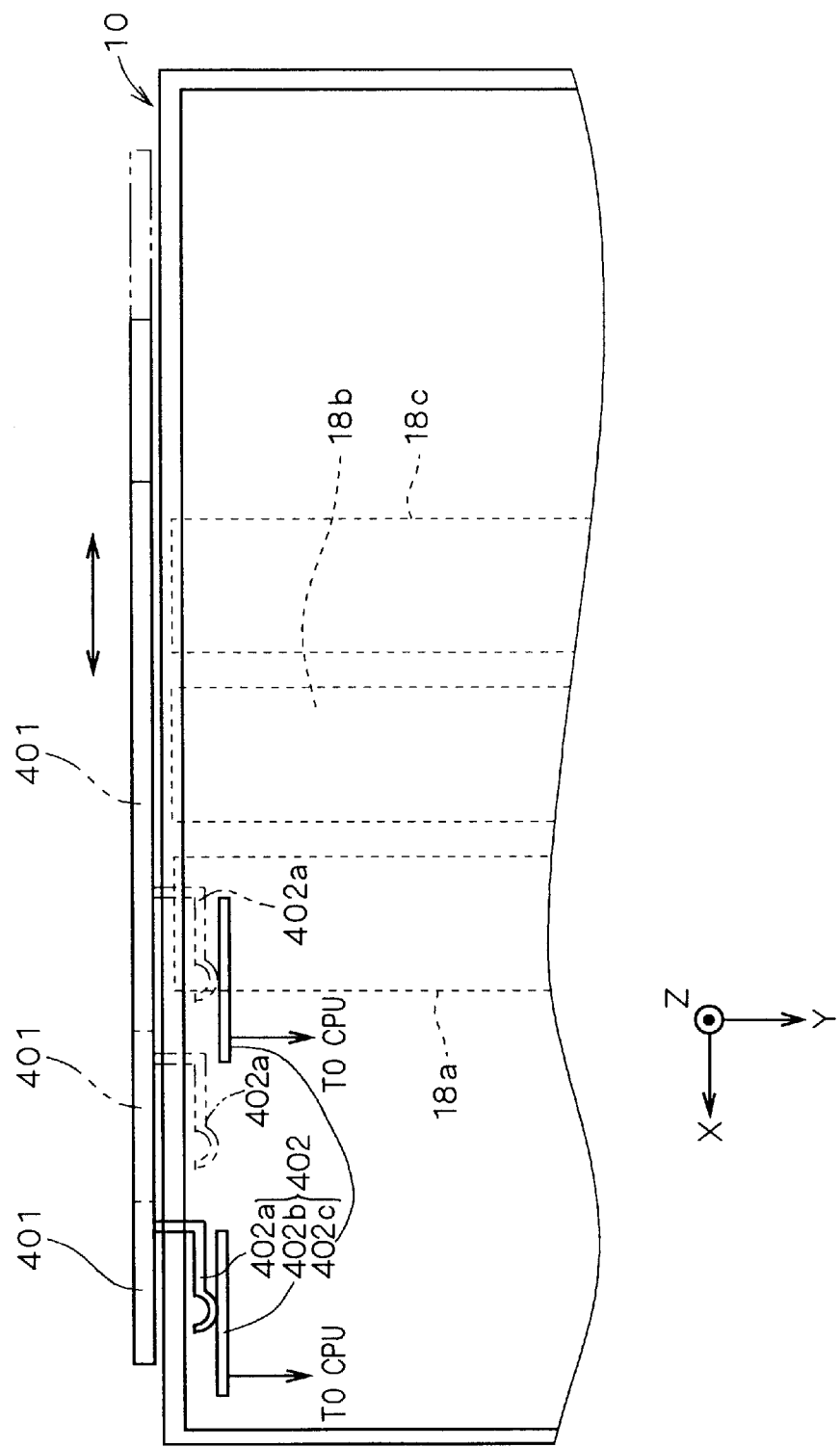

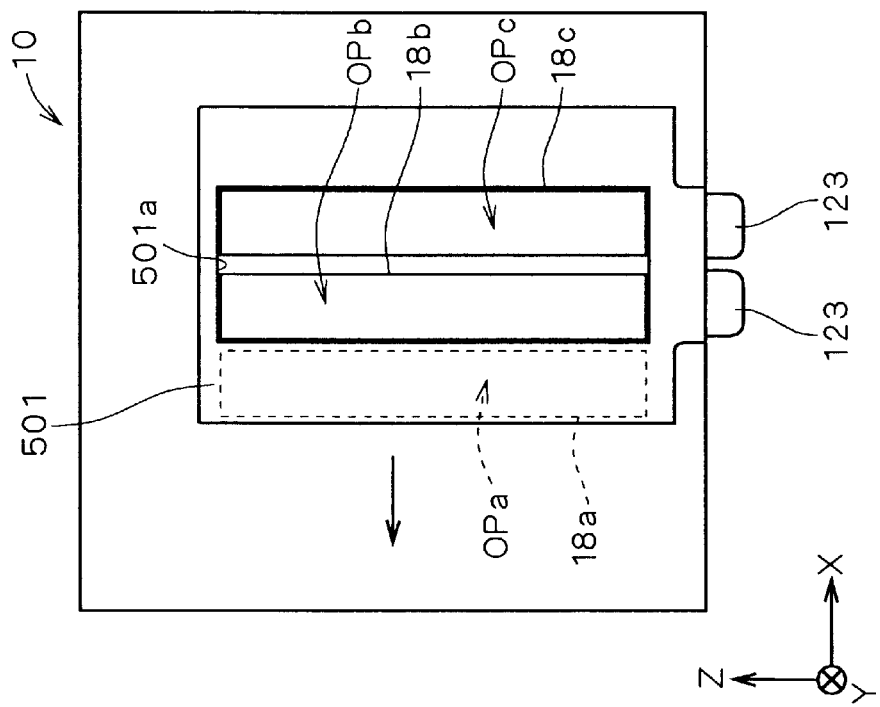
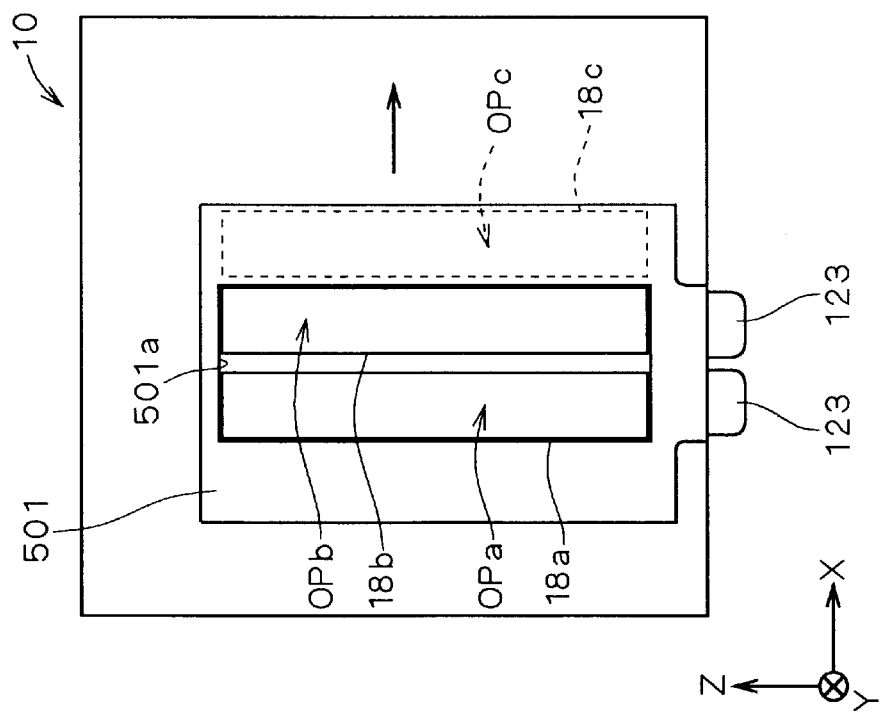

ELECTRONIC DEVICE USING CARD-TYPE MEDIA

This application is based on application No. 11-367304 filed in Japan, the contents of which are hereby incorporated by reference.

BACKGROUND OF THE INVENTION

1. Field of the Invention

This invention relates to an electronic device which operates together with attached card-type media.

2. Description of the Background Art

Recently, among electronic devices (digital cameras, personal computers, music recorders, etc.) that have been put into the market, some of them are provided with medium-attaching parts (card slots) to which a plurality of cards are attached. For example, in the case of a digital camera, the digital camera has an arrangement in which two recording cards are inserted into two card slots, and when capturing an image, the captured image data is recorded in these recording cards. When these recording cards are taken out from the digital camera, first, the cover attached to the card slot is opened, and then, after removing the lock, the recording cards are taken out. When the lock has been removed, the corresponding detection of the sensor forces the digital camera to suspend access to the recording cards. Here, since the cover is commonly used for both of the card slots, switching is made between the opened state and the closed state with respect to both of the card slots. Moreover, a single lock member is used to commonly lock or commonly release both of the two card slots.

The electronic device having the above-mentioned arrangement has the following problems:

(1) It is difficult to confirm which one of the two recording cards is not being currently accessed, or being currently accessed.

(2) Both of the two cards are commonly locked regardless of whether or not it is accessed; therefore, it is not possible to take out only the card not being accessed.

(3) Even in the case when only one card has been attached to one of the card slots, the lock is applied to both of the card slots; therefore, another card cannot be inserted to the other card slot unless the lock is released.

SUMMARY OF THE INVENTION

The present invention is directed to an electronic device for executing a predetermined function using electronic data.

In an aspect of the present invention, the electronic device comprises: a plurality of medium-attaching parts to which card-type media can be attached through a plurality of openings, respectively, the plurality of openings being arranged on positions accessible from outside; and a cover movable in direction of arrangement of the plurality of openings and selectively exposing at least one of the plurality of openings.

In this electronic device, the attaching and removing operations of a card-type medium to and from a plurality of card slots are selectively carried out.

Accordingly, an object of the present invention is to provide an electronic device having medium-attaching parts which enables an attaching and removing operation of a card-type medium to and from one of the medium-attaching parts even with another card-type medium being attached to another medium attaching part.

These and other objects, features, aspects and advantages of the present invention will become more apparent form the following detailed description of the present invention when taken in conjunction with the accompanying drawings.

BRIEF DESCRIPTION OF THE DRAWINGS

FIGS. 5A and 5B are side views that show states of shifts of a slot cover;

FIGS. 12A to 12C are drawings that show states of shifts of the slot cover in the digital camera in accordance with the second preferred embodiment;

FIG. 13 is a drawing that shows a state of a cover-position detection switch;

FIG. 14 shows the ejection mechanism;

FIG. 19 is a drawing that shows a state of a cover-position-detection switch;

FIGS. 20A and 20B are drawings that show states of shifts of the slot cover in the digital camera in accordance with the fifth preferred embodiment;

DESCRIPTION OF THE PREFERRED EMBODIMENTS

1. First Preferred Embodiment

1-1. Entire Structure

Figure 1:
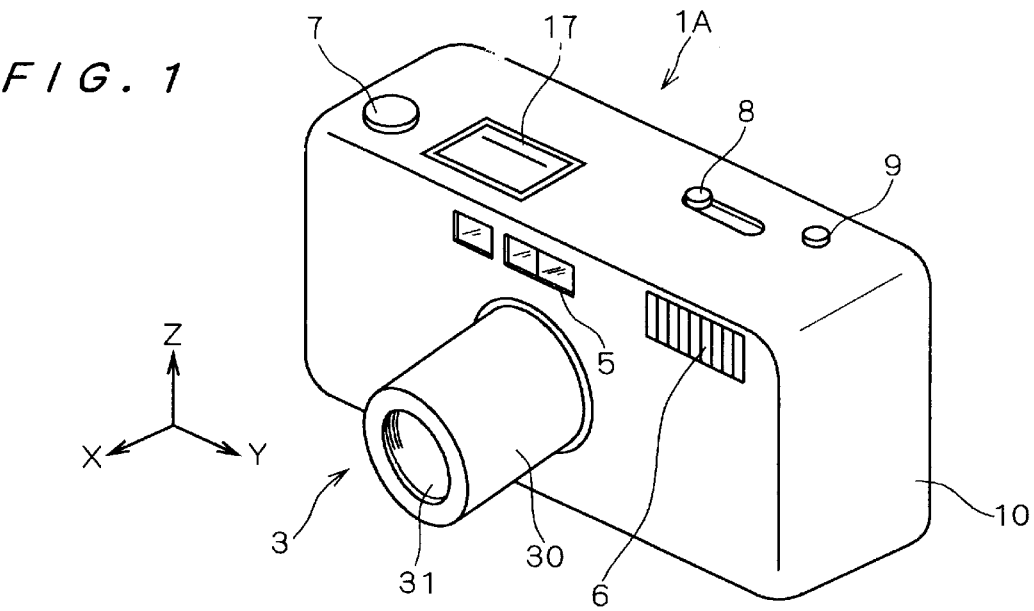
FIGS. 1 and 2 are perspective views that show external appearances of a digital camera.
Figure 2:
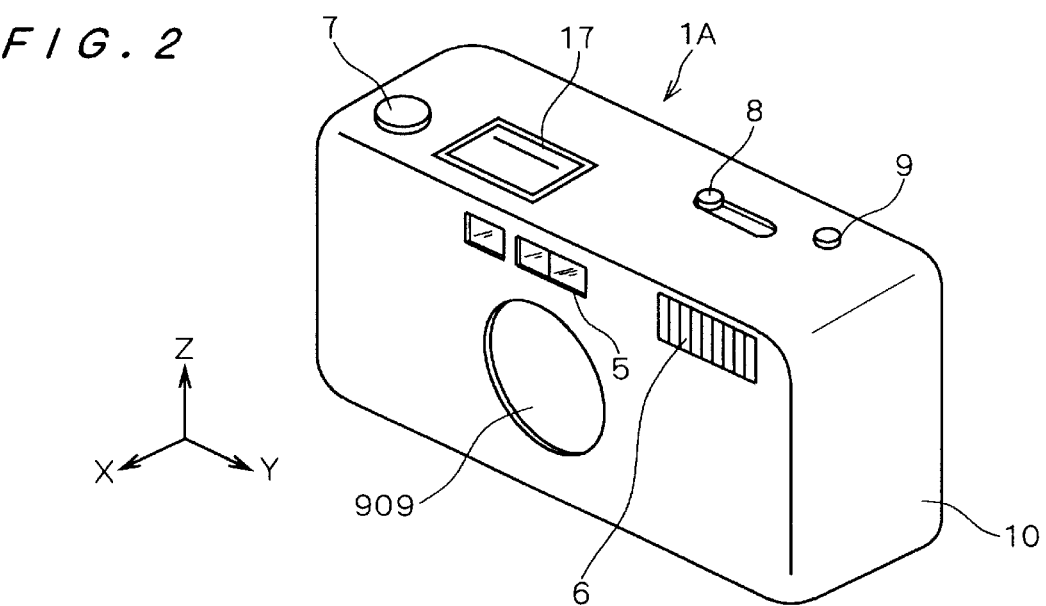
Figure 3:
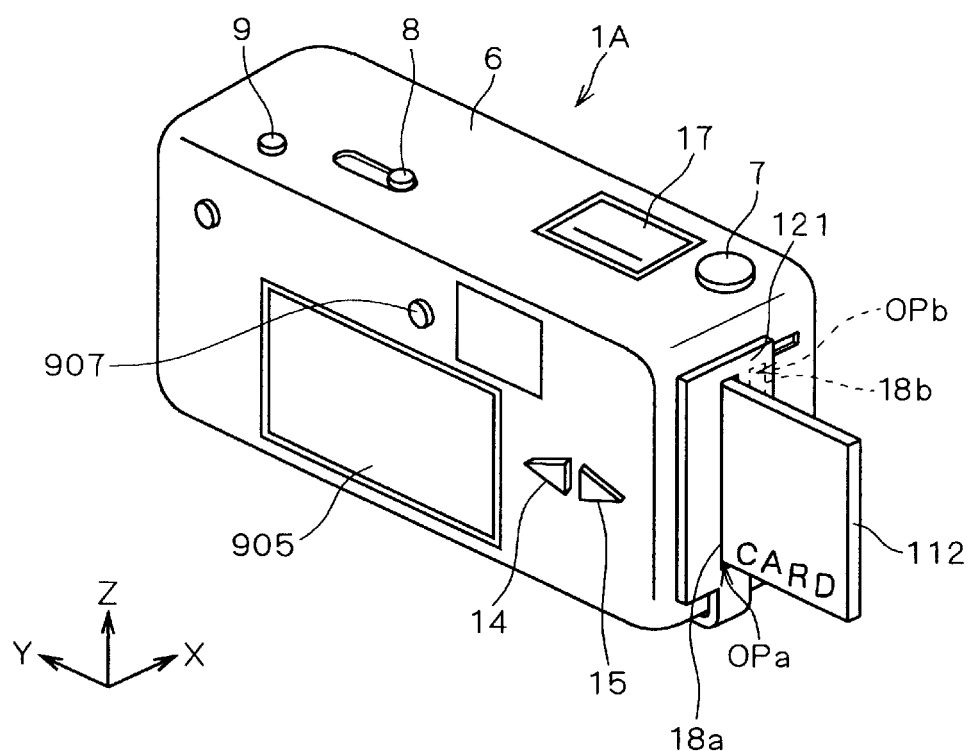
FIG. 3 is a perspective view that shows an external appearance of the digital camera in accordance with the first preferred embodiment.

FIGS. 1 and 2 are views that respectively show external appearances of a digital camera 1A in accordance with the first preferred embodiment of the present invention (digital cameras 1B to 1E in accordance with the second to fifth preferred embodiments have the same components in FIGS. 1 and 2). FIG. 1 is a perspective view taken from the front side, and FIG. 2 is a perspective view taken from the front side in a state where a lens unit is withdrawn in the camera body. Moreover, FIG. 3 is a perspective view taken from the rear side, which shows an external components of the digital camera 1A. The digital camera 1A is mainly constituted by a lens unit 3 having an almost cylindrical shape and a camera body 10 having an almost rectangular parallelepiped shape.

The lens unit 3 is provided with a lens system 31 and a lens barrel 30 for holding the lens system 31. The lens barrel 30 is arranged so as to protrude and retreat from and into the camera body 10, and when it has retreated therein, a lens barrier 909 closes and covers the lens system 31.

An AF unit 5 for executing an automatic focusing operation (hereinafter, referred to as an AF operation) and a flash 6 are placed on the upper front section of the camera body 10.

Moreover, a release button 7, a mode switch 8 and a self-capturing setting switch 9 and a display 17 are placed on its upper face.

The release button 7 is an operation member which turns a switch SW1 (see FIG. 4) "ON" (ready for capturing an image) when it is half-pressed, and turns a switch SW2 "ON" (released) when it is full-pressed. The mode switch 8 makes switching among "OFF", "Record" and "Playback" modes. The self-capturing setting switch 9 makes switching between a normal image-capturing process and a capturing process with a self-timer. The display device 17, which is constituted by, for example, an LCD, displays the contents of setting modes, such as data for capturing, setting for capturing with a self-timer and frame numbers at the time of image capturing.

Moreover, the camera body 10 is provided with openings OPa and OPb which are portions accessible from outside and which are arranged on one side face thereof, and two card slots 18a and 18b are fixed inside the camera body 10 for the respective openings OPa and OPb. Each of the card slots 18a and 18b is a loading inlet having a slit shape through each of openings OPa and OPb which a card-type medium 112, such as an external recording medium (hereinafter, referred to as memory card) and a modem card, is inserted to be used therein. In other words, the digital camera 1A is allowed to expand its functions by inserting the card-type medium 112 through card slots 18a and 18b. A slot cover 121 is placed so as to cover the card slots 18a and 18b. The components of the card slots 18a and 18b and the slot cover 121 will be described later.

The camera body 10 is provided with zoom buttons 14 and 15 and a focusing lamp 907 on its rear face.

With respect to the zoom buttons 14 and 15, when capturing an image, the zoom button 14 is pressed, the lens system 31 is driven to shift toward the wide side (wide angle end), and when the zoom button 15 is pressed, the lens system 31 is driven to shift toward the tele side (telephoto end). The zoom buttons 14 and 15 also serve as access buttons used for calling for image data recorded in the memory card at the time of playback, and each time the zoom button 14 is accessed, the recorded image is forwardly (UP) sent, while each time the zoom button 15 is accessed, the recorded image is reversely (DOWN) sent.

When capturing an image, the release button 7 is half-pressed (the switch SW1, which will be described later, is turned on), the focusing lump 907 is allowed to turn on upon completion of the image-acquiring preparation process, and is also allowed to flicker when the image-capturing is not possible because of too short a range to the subject or when the flash charging process is being executed, thereby informing the user of the fact.

Figure 4:
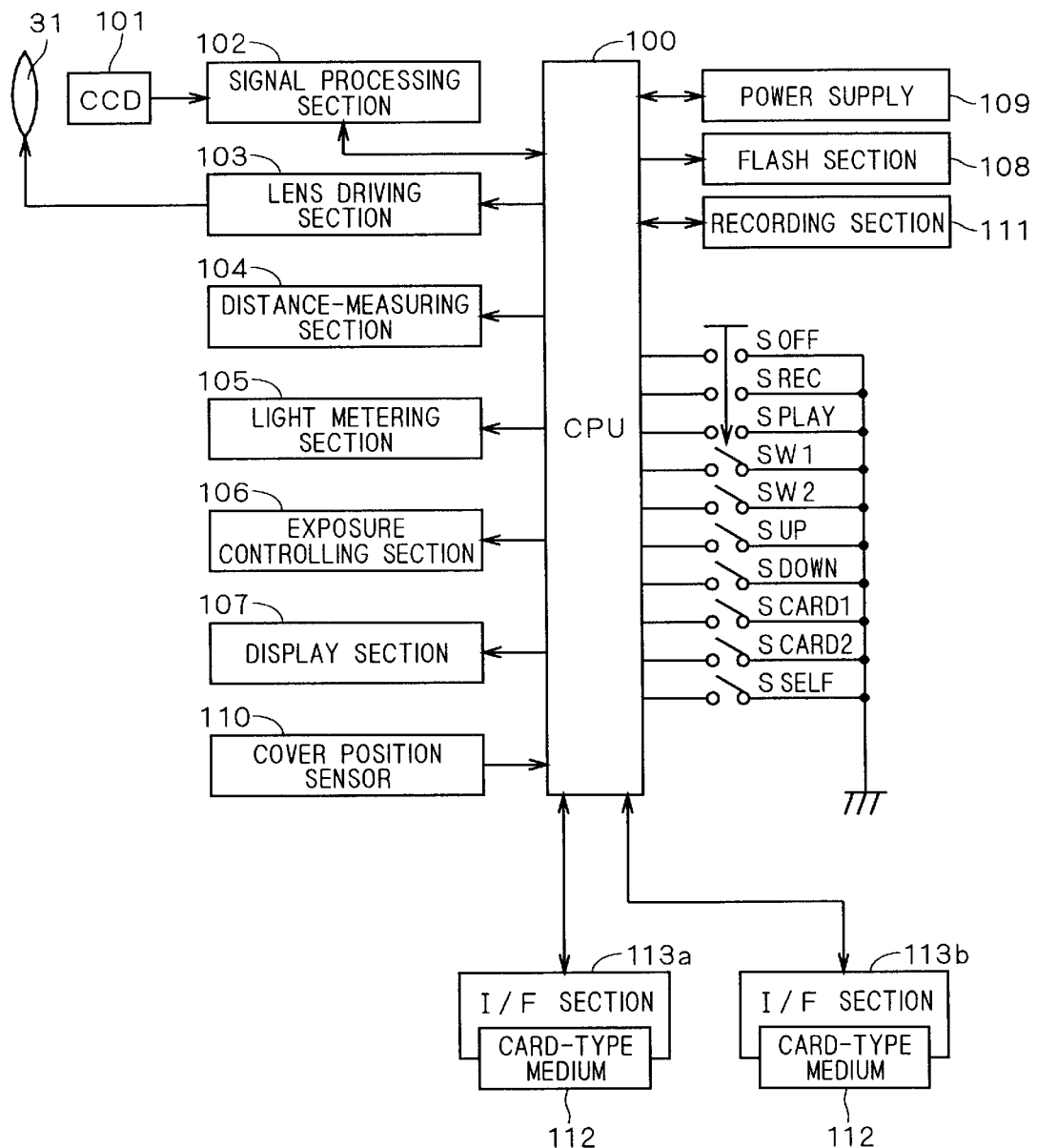
FIG. 4 is a block diagram that shows functional components of the digital camera.

FIG. 4 is a block diagram that shows functional components of the digital camera 1A.

The digital camera 1A is provided with a system controller (hereinafter, referred to as CPU) 100 for controlling the entire operation of the digital camera. The CPU 100 carries out various functions by executing predetermined software programs.

An image of a subject which is converged through the lens system 31 is picked up by an imaging device (hereinafter, referred to as CCD) 101, and the output image signal from the CCD 101 is processed by the signal processing section 102. The lens system 31 is controlled and driven by the lens driving section 103 so as to be in a focused state based upon the result of distance measuring. A distance-measuring section 104 measures a distance to the subject by utilizing, for example, a phase-difference detection method, and based upon the distance data, the amount of driving of the lens system 31 carried out by the lens driving section 103 is calculated. The lens driving section 103 also drives the lens barrel 30 to advance and retreat, and drives the lens barrier 909 to open and close. A light metering section 105 measures the luminance of the subject, and outputs the light metered data to the CPU 100. An exposure controlling section 106 receives data of the exposing time (shutter speed) Tv and the aperture value Av, obtained based upon the results of the distance measuring and the light metering and sent from the CPU 100, and carries out the exposure control of the digital camera 1A.

The flash section 108, which is controlled by a voltage-raising controlling signal and a light-emitting controlling signal, carries out a light-emitting process of the flash 6. A power supply 109 supplies power to the CPU 100 and each component in the camera.

A recording section 111 is fixedly located in the digital camera 1A. During an image capturing process, captured image data which is subjected to predetermined image processes in the signal processing section 102 is recorded in the recording section 111.

The card-type medium 112 is a recording medium that deals with image data (electronic data) and is freely attached to and removed from the camera body 10. Data transfer is carried out between the card-type medium 112 attached to the card slot 18a or 18b and the CPU 100 through I/F section 113a or 113b provided in the card slot 18a or 18b. The captured image data, stored in the recording section 111, is temporarily transferred to the card-type medium 112 which is a memory card, and read out on the side of a personal computer.

A cover-position sensor 110 is a light-receiving device for receiving light and transmitting the intensity signal of the light to the CPU 100. Thus, the CPU 100 can detect the position of the slot cover 121. This mechanism will be described in detail later.

The display section 107 corresponds to the display device 17 and the LCD 905 in FIG. 3.

Next, the following description will discuss functions of switches $S_{OFF}$ to $S_{SELF}$.

$S_{OFF}$: A switch which is turned on when the mode switch 8 is at "OFF" position to make the digital camera 1A inoperative.

$S_{REC}$: A switch which is turned on when the mode switch 8 is at "Recording" position to make the digital camera 1A operative.

$S_{PLAY}$: A switch which is turned on when the mode switch 8 is at "Playback" to make the playback of recording images operative on the LCD 905.

SW1: A switch which is turned on at the time of one-step-pressing (half-pressing) of the release button 7 when capturing an image so as to get ready for the image-capturing process.

SW2: A switch which is turned on at the time of two-step-pressing (full-pressing) of the release button 7 so as to give an instruction for exposure.

$S_{UP}$: A switch which is turned on every time the zoom button 15 is pressed, so as to drive the lens system 31 toward the tele side or forwardly playback a recorded image.

$S_{DOWN}$: A switch which is turned on every time the zoom button 14 is pressed, so as to drive the lens system 31 toward the wide side or reversely playback a recorded image.

$S_{CARD1}$: A switch which is turned on when the card-type medium 112 is inserted in the card slot 18a.

$S_{CARD2}$: A switch which is turned on when the card-type medium 112 is inserted in the card slot 18b.

$S_{SELF}$: A switch which is turned on every time the self-capturing setting switch 9 is pressed and switches between the normal image-capturing process and the capturing process with a self-timer.

1-2. Main Portion

The following description will discuss the main portion of the digital camera 1A. FIGS. 5A and 5B are side views that show the slot cover 121 of the digital camera 1A in accordance with the first preferred embodiment and the manner of slide of the slot cover 121. FIG. 5A shows a state in which the slot cover 121 is shifted rightward (to the positive side on the X-axis) and FIG. 5B shows a state in which the slot cover 121 is shifted leftward (to the negative side on the X-axis).

As illustrated in FIGS. 5A and 5B, the slot cover 121 has a size that is sufficiently large to cover the entire openings OPa and OPb, and an opening 121a having a size and a shape substantially equal to those of the opening OPa (or OPb) of one card slot 18a (or 18b) almost in the center thereof. On the surface of the camera body 10 on which the slot cover 121 is placed, a guide groove 10a is formed, and in contrast, on the surface of the slot cover 121 opposite to the camera body 10 side, a slid guide 121b (see FIGS. 8 and 9) is placed. Thus, the slide guide 121b is fitted to the guide groove 10a so as to freely slide along the guide groove 10a so that the slot cover 121 is supported on the camera body 10 and allowed to slide (move) in the positive or negative direction of the X axis that is the direction of the arrangement of the openings OPa and OPb, as indicated by arrow A1.

In a state where the slot cover 121 has been shifted to the X-axis negative side as indicated by FIG. 5B, the opening 121a is located at a position that substantially overlaps the opening OPa of the card slot 18a. Hereinafter, this position of the slot cover 121 is referred to as a first position.

As illustrated in FIG. 5A, in a state where the slot cover 121 has been shifted to the X-axis positive side, the opening 121a is located at a position substantially overlaps the opening OPb of the card slot 18b. Hereinafter, this position of the slot cover 121 is referred to as a second position.

As will be described later, the slot cover 121 is not stopped at positions other than the first position and the second position.

A cover-position sensor 110 is placed at a position that is always covered with the slot cover 121 in the vicinity of the card slots 18a and 18b of the camera body 10. The cover-position sensor 110 is constituted by a pair of a light-emitting device and a light-receiving device (omitted from the Figures). The rear face of the slot cover 121 (on the camera body 10 side) is painted and divided into a high reflective portion (for example, white or silver) and a low reflective portion (for example, black) with respect to light emitted from the light-emitting device. The portions correspond to the positions opposite to the cover-position sensor 110 when the slot cover 121 is located at the first position and the second position. The light-receiving device receives the light that is emitted and reflected on the slot cover 121, and sends the intensity signal of the light to the CPU 100. Thus, the CPU 100 is allowed to detect whether the slot cover is located at the first position or the second position based upon the intensity signal.

Figure 6:
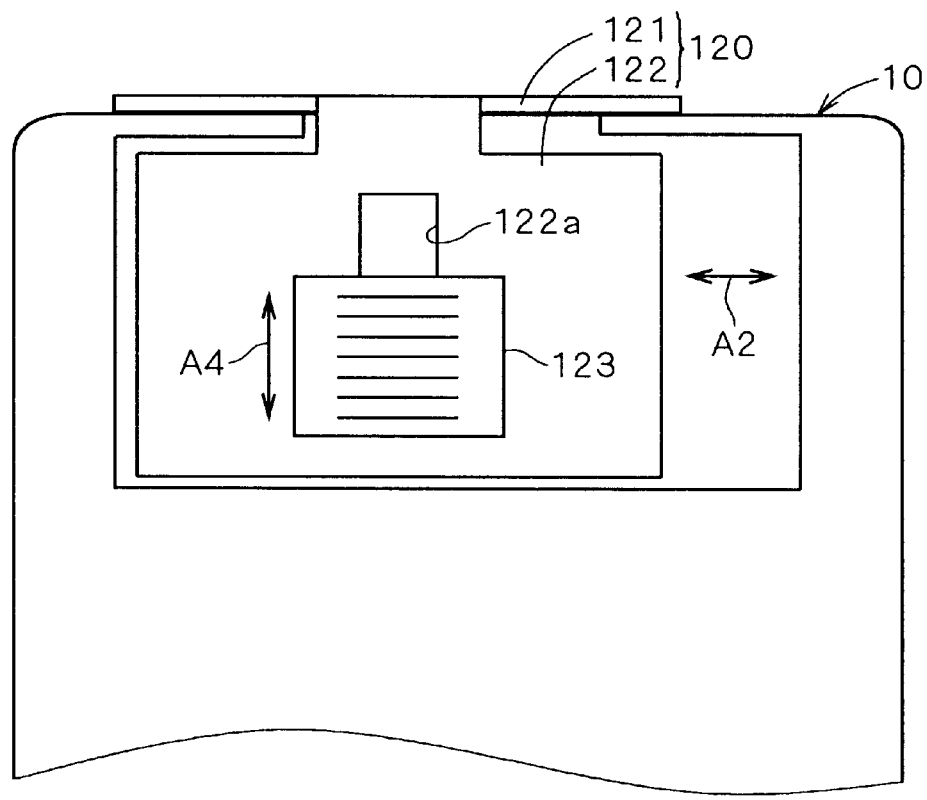
FIG. 6 is a partial bottom view of the digital camera.

FIG. 6 shows a partial bottom view of the digital camera 1A. As illustrated in FIG. 6, the slot cover 121 is connected to a guide plate 122 that slides (moves) on the bottom face of the camera body 10. In other words, the slot cover 121 and the guide plate 122 integrally form a slide member 120, and the slide member 120 as a whole is allowed to shift rightwards and leftwards (positive and negative directions on the X-axis) as indicated by arrows A2. Furthermore, an eject button 123 is placed on the guide plate 122.

Figure 7:
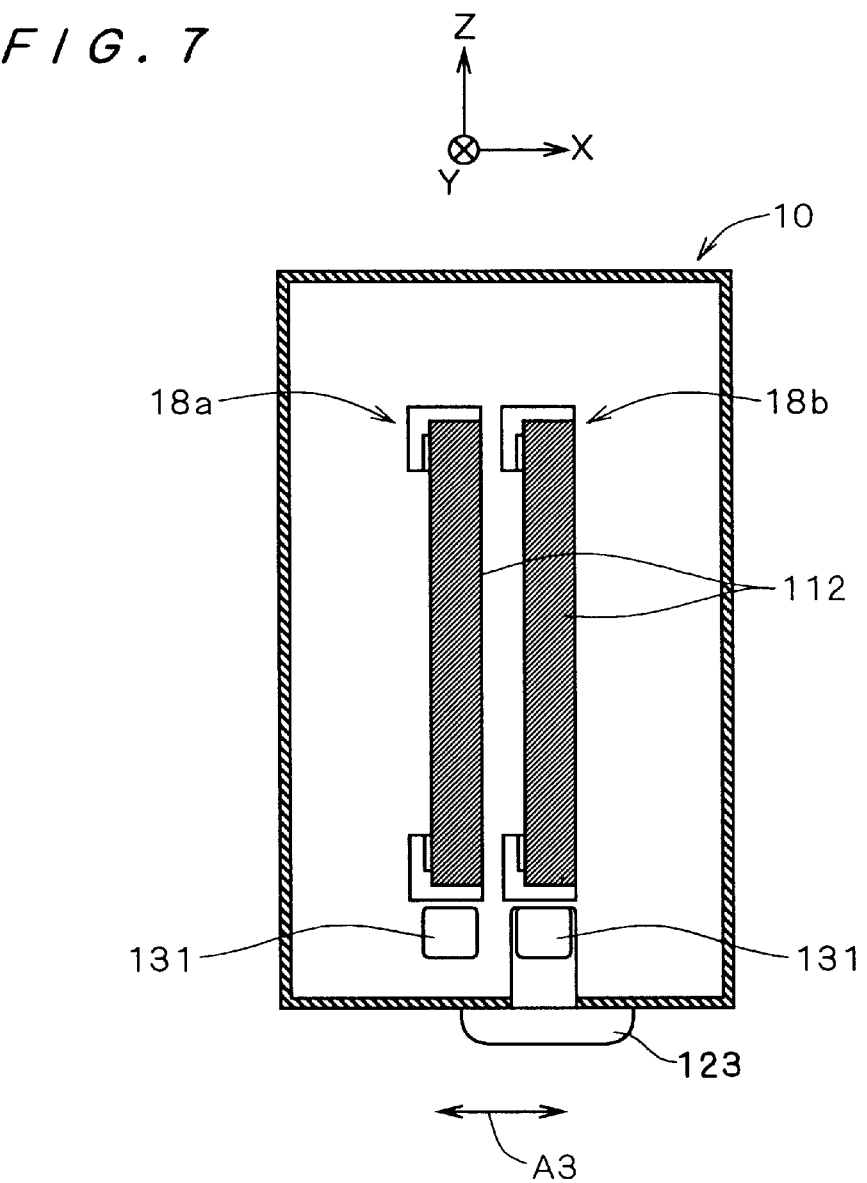
FIG. 7 is a partial cross-sectional view that shows the relationship between an eject button and card slots.

FIG. 7 is a partial cross-sectional view of the digital camera 1A indicating the relationship between the eject button 123 and the card slots 18a and 18b. Eject levers 131 are placed on the respective card slots 18a and 18b so as to eject card-type medium 112 attached thereto.

Figure 8:
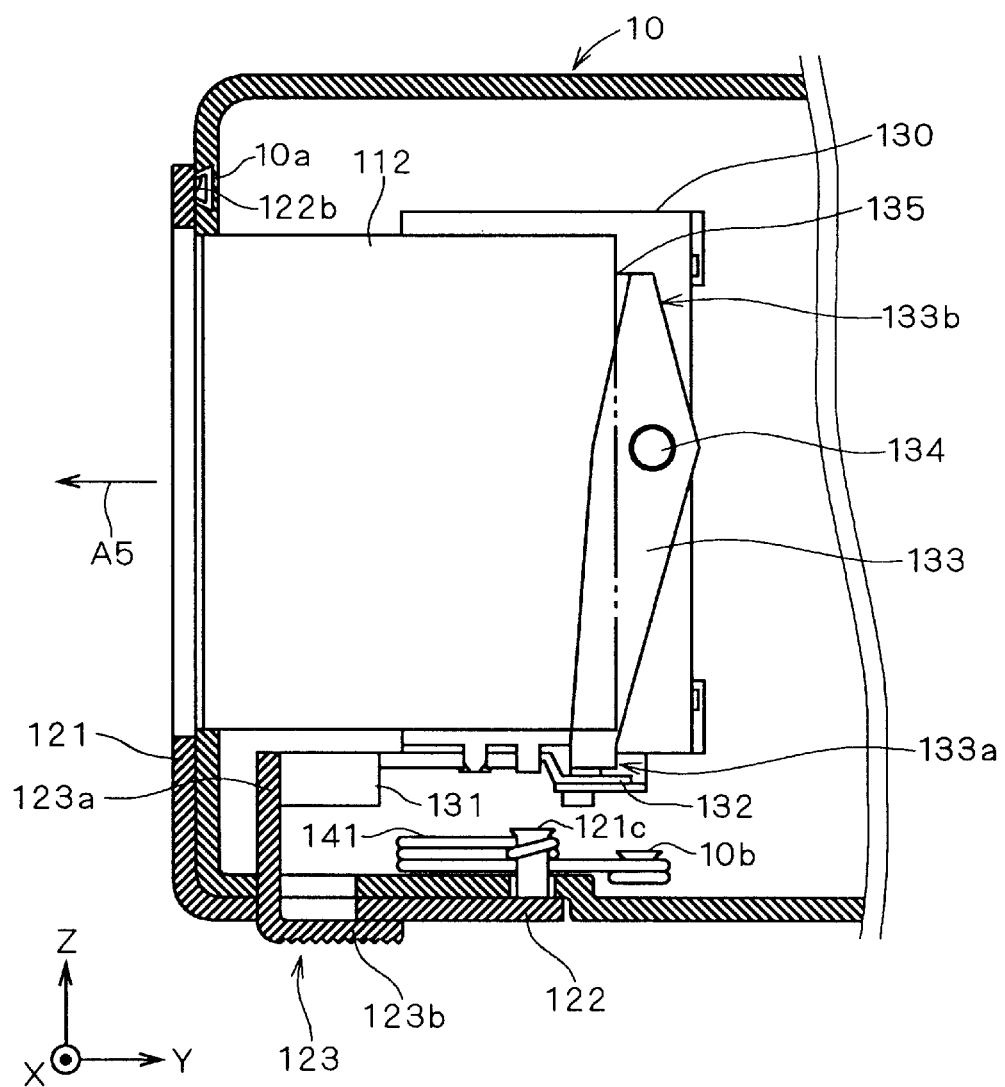
FIGS. 8 and 9 are partial cross-sectional views that show an ejection mechanism of the card slot.
Figure 9:
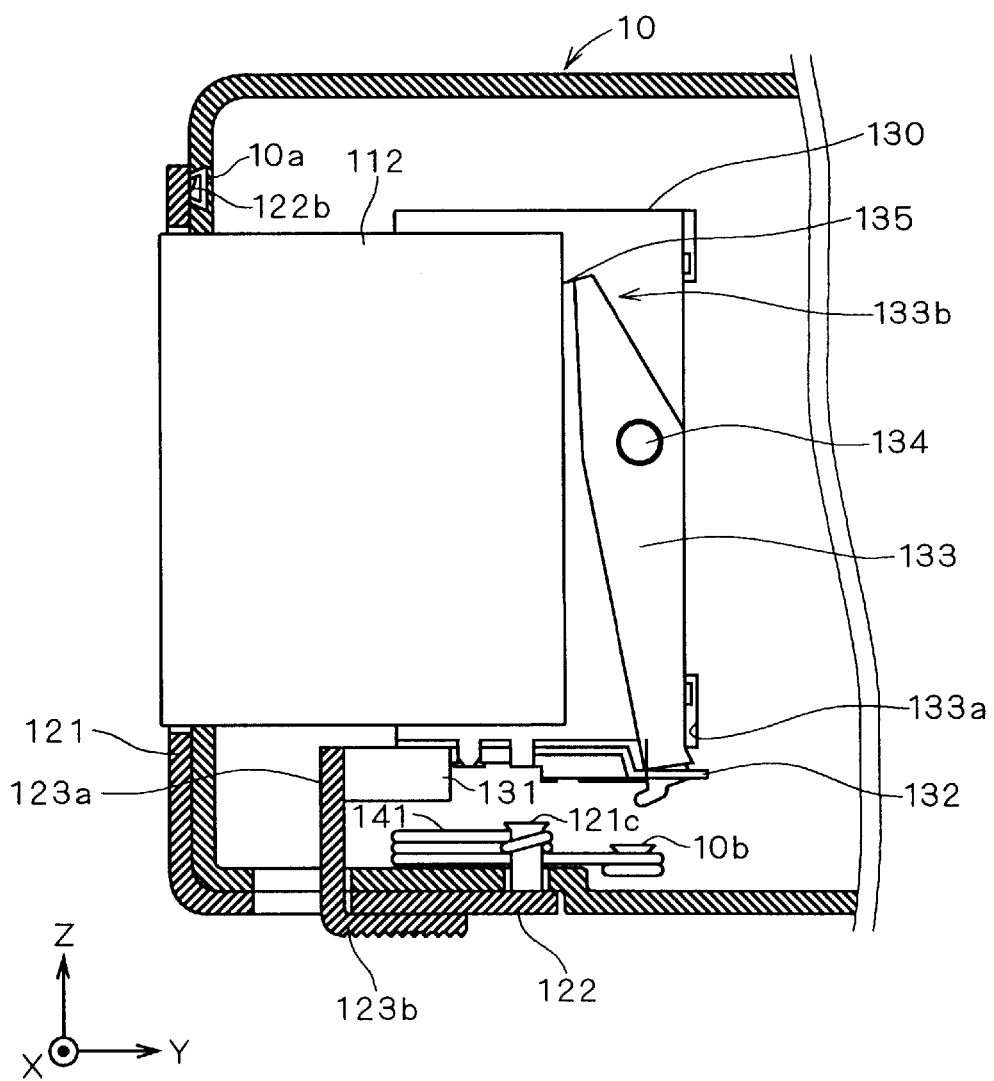

FIGS. 8 and 9 are partial cross-sectional views that show the ejection mechanisms of the card slots 18a and 18b, and FIG. 8 shows a state in which the card-type medium 112 is attached thereto, and FIG. 9 shows a state in which the card-type medium 112 has been removed therefrom. As illustrated in FIG. 8, the eject button 123 is constituted by a contact section 123a and a button section 123b, and the contact section 123a and the button section 123b are connected vertically to each other so as to form a member having an L-letter shape in its Y-Z cross-section. The contact section 123a exists in the camera main body 10 of the digital camera 1A and the button section 123b is exposed to the outside of the guide plate 122 on the bottom face of the camera body 10. Inside the camera body 10, the contact section 123a contacts one end of the eject lever 131 in the card connector 130. The card connector 130 is provided with a terminal to be connected to the terminal of the card-type medium 112.

In FIG. 7, as described above, the guide plate 122 is allowed to move as indicated by arrow A3 in association with the slot cover 121, and in accordance with this movement, the contact section 123a of the eject button 123 is switched so as to contact the eject lever 131 of either the card slot 18a or the card slot 18b.

As shown in FIG. 6, the eject button 123 freely moves in the direction of arrow A4 (positive and negative directions on the Y-axis) along the elongated guide hole 122a that is formed almost in the center of the guide plate 122 with its lengthwise direction being coincident with the Y-axis direction. In a state where a card-type medium 112 is attached to the card slots 18a or 18b, the eject button 123 is located at the end on the negative side of the guide hole 122a in the Y-direction. In this state, when the user presses the eject button 123 down in the positive direction along the Y-axis, the eject button 123 shifts to the positive end of the guide hole 122a in the Y-axis direction as shown in FIG. 6. In this case, the pressing force, applied to the eject button 123, is transmitted to the eject lever 131 through the contact section 123a, and further to the negative end 133a of the eject lever 133 in the Z-axis through the driving force transmitting member 132.

The eject lever 133 is connected to a rotation shaft 134 extending in the X-axis direction so as to freely pivot around it, and a card pushing member 135 is placed on the other end of the eject lever, that is, the positive side end 133b thereof along the Z-axis. By this mechanism, the pressing force of the eject button 123, applied to the negative side end 133a of the eject lever 133 along the Z-axis, allows the card pushing member 135 to shift toward the negative side in the Y-axis direction by the rotation of the eject lever 133, thereby shifting the inserted card-type medium 112 in arrow A5 direction (negative direction in the Y-axis) in FIG. 8; thus, as illustrated in FIG. 9, the card-type medium 112 is removed from the card slot 18a or 18b.

As illustrated in FIG. 5, the eject button 123 is placed at a position on the guide plate 122 corresponding to the opening 121a of the slot cover 121. With the component, this digital camera 1A makes it possible to selectively eject only the card-type medium 112 attached to the card slot 18a or 18b exposed from the opening 121a of the slot cover 121 by pressing the eject button 123.

Figure 10:
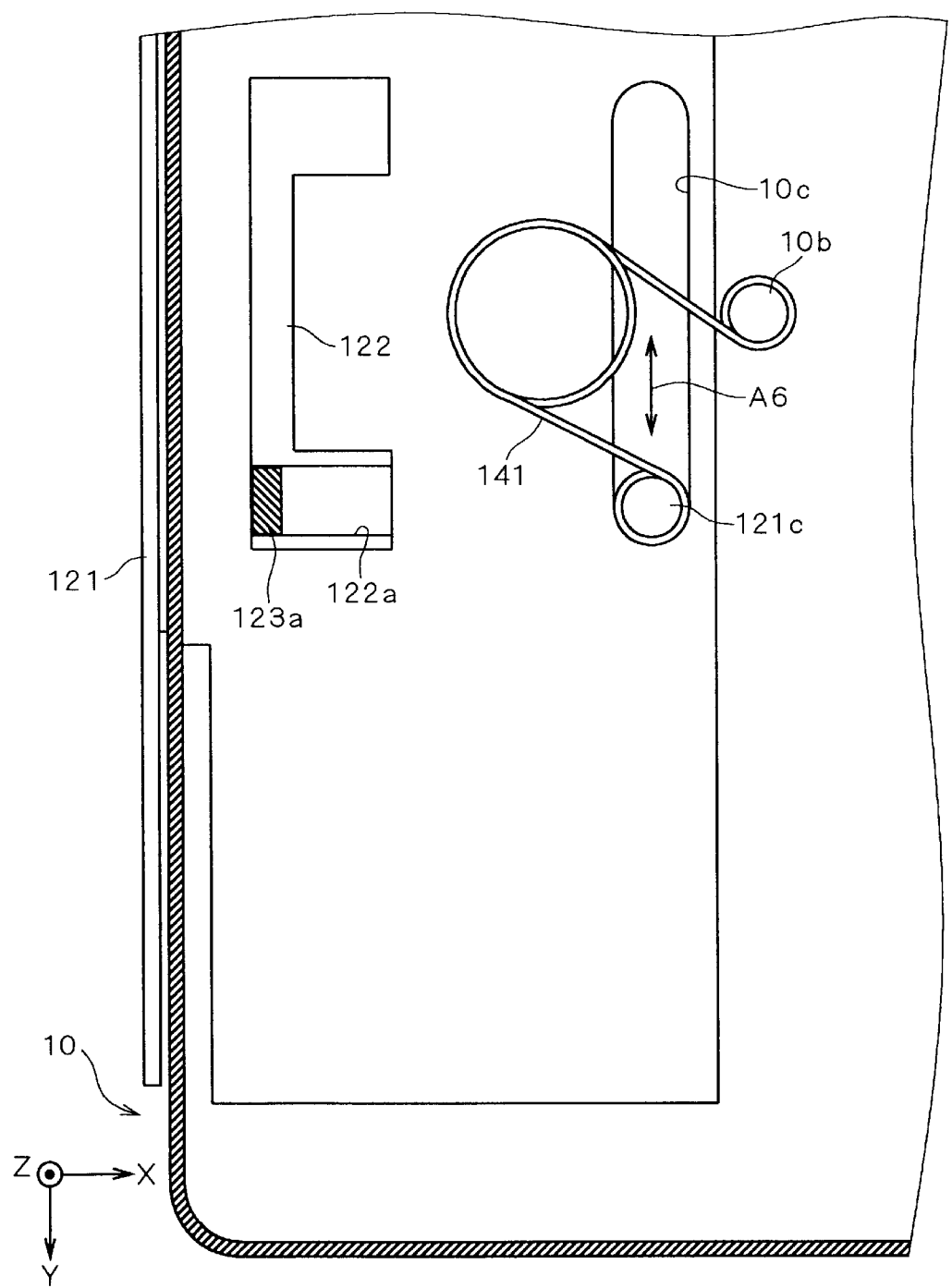
FIG. 10 shows an internal structure for positioning the slot cover.

FIG. 10 shows internal components for positioning the slot cover 121. As illustrated in FIG. 10, a snap spring 141 is attached to the inner bottom face of the camera body 10 of the digital camera 1A. The two ends of the snap spring 141 are respectively attached to a main body shaft 10b fixed in the camera main body 10 and a cover shaft 121c fixed on the slot cover 121 in a manner so as to freely pivot thereon.

The cover shaft 121c freely shifts inside a guide hole 10c along the guide hole 10c formed in the camera body 10, and in accordance with the shift of the slot cover 121, it is moved in the direction of arrow A6 (positive and negative directions on the X-axis). The snap spring 141 applies force in the departing direction with respect to the two ends thereof. For this reason, as will be described below, the cover shaft 121c only stops at both ends of the guide hole 10c, and is not allowed to stop in the middle of the course.

Figure 11A:
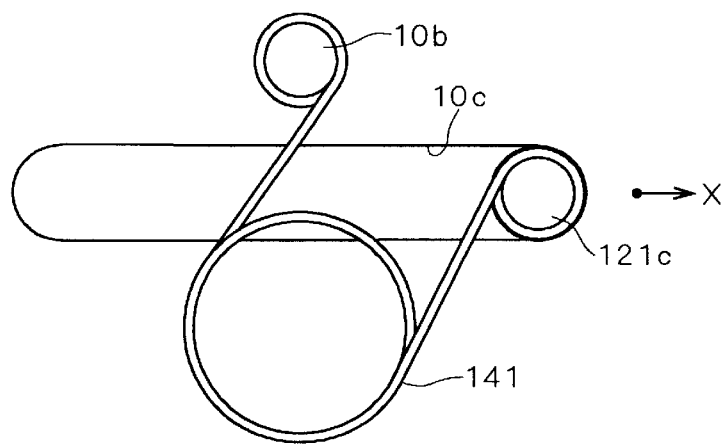
FIGS. 11A to 11C are drawings that show states of a snap spring at the time of moving the slot cover.
Figure 11B:
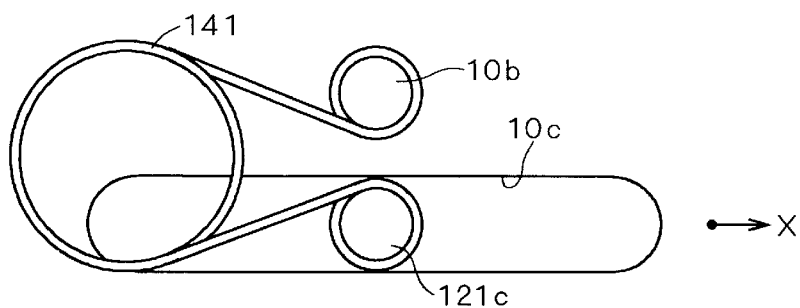
Figure 11C:
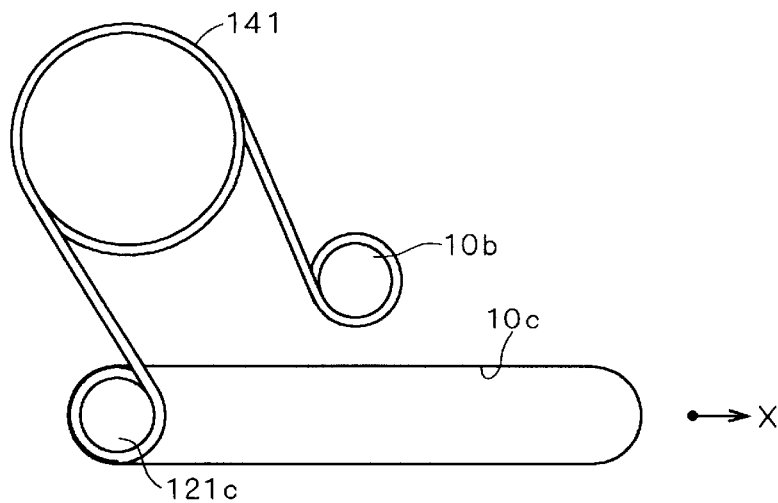

FIGS. 11A to 11C are drawings that show the snap spring 141 while opening and closing the slot cover 121. FIG. 11A shows a state in which the cover shaft 121c is located at the end of the guide hole 10c on the positive side of the X-axis as illustrated in FIG. 10 and the slot cover 121 is located at the first position (FIG. 5B), that is, a state in which the opening OPa of the card slot 18a is exposed. In order to expose (open) the opening OPb of the card slot 18b from this state, the user shifts the slot cover 121 in the X-axis negative direction (see FIGS. 5A and 5B), the cover shaft 121c is also moved in the X-axis negative direction along the guide hole 10c. If the user releases the finger in the middle of the shifting, the returning force is exerted in the X-axis positive direction due to the force of the snap spring 141 until the cover shaft 121c has reached the middle of the guide hole 10c as illustrated in FIG. 11B. The slot cover 121 is returned to the state shown in FIG. 11A, that is, to the first position.

However, in the case when the cover shaft 121c is further shifted in the X-axis negative direction passing through the state as illustrated in FIG. 11B, force is exerted reversely in the X-axis negative direction due to the force from the snap spring 141 so that, if the user releases the finger in the middle of the shifting, the cover shaft 121c is located at the X-axis negative side end of the guide hole 10c, that is, the slot cover 121 is shifted to the second position (FIG. 5A). In this manner, the pressing direction of the snap spring 141 to the cover shaft 121c changes from the X-axis positive direction to the X-axis negative direction through the state as shown FIG. 11B; thus, the cover shaft 121c is always pressed in the X-axis positive direction or negative direction. As a result, the slot cover 121 is not allowed to stop at positions other than the first position and the second position.

With the above-mentioned arrangement, as illustrated in FIGS. 5A and 5B, the digital camera 1A can expose only either the opening OPa or OPb of the two card slots 18a and 18b selectively. As described earlier, the CPU 100 always confirms the position of the slot cover 121 by using the cover-position sensor 110, and controls process so as to inhibit access (data transferring) to the card-type medium 112 attached to the card slot whose opening is exposed to outside. In contrast, the CPU 100 allows access only to the card-type medium 112 attached to the card slot covered with the slot cover 121.

Since it is possible to eject only the card-type medium 112 attached to the card slot whose opening is exposed as described above, it is allowed to attach or remove the card-type medium 112 only to or from the card slot whose opening is exposed, and it is not allowed (restricted physically) to attach or remove the card-type medium 112 to or from the card slot whose opening is not exposed. Moreover, based upon the output from the cover-position sensor 110, the card slot whose opening is exposed is discriminated and control is performed not to access the card-type recording medium attached to the corresponding card slot. Therefore, it is possible to prevent the user from erroneously removing the card-type medium 112 that is being accessed by the CPU 100, and consequently to avoid damages to the card-type medium 112 and the hardware and software of the digital camera 1A; thus, it becomes possible to provide a safer digital camera.

2. Second Preferred Embodiment

Figure 12B:
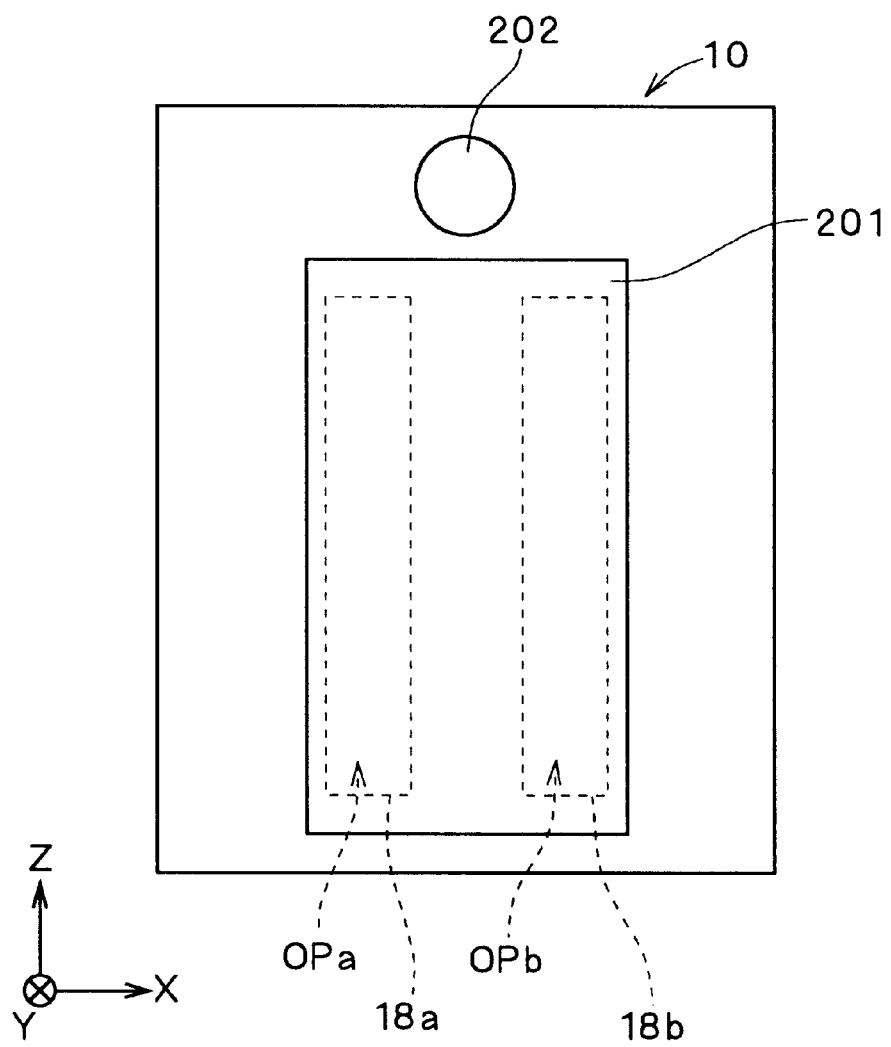

FIGS. 12A to 12C show states of shifts of the slot cover in a digital camera 1B (see FIGS. 1 and 2) in accordance with the second preferred embodiment; FIG. 12A shows a state in which the slot cover has shifted to the X-axis negative side, FIG. 12C shows a state in which the slot cover has shifted to the X-axis positive side; and FIG. 12B shows a state between FIGS. 12A and 12C.

In the same manner as the openings OPa and OPb of the first preferred embodiment, the openings OPa and OPb (forming aligned openings) of the digital camera 1B in accordance with the second preferred embodiment are placed on a side face of the camera body 10 that is an externally accessible portion. The slot cover 201 of the digital camera 1B has a rectangular shape having a size that covers either of the openings OPa and OPb at the shift end, and covers both of the openings OPa and OPb in the middle position. The digital camera 1B is also provided with a sliding mechanism in the same manner as the guide groove 10a and the slide guide 121b in the first preferred embodiment (not shown in FIGS. 12A to 12C), and the slot cover 201 is freely allowed to slide (move) in positive and negative directions along the X-axis that is an aligned direction of the openings OPa and OPb. The card slots 18a and 18b are also fixed inside the camera body 10 correspondingly to the openings OPa and OPb.

However, the slot cover 201 in the second preferred embodiment is engaged and stopped by a clip stopper at both of its sliding ends and at its middle position. Instead of the eject button 123, an eject switch 202, which is an electrical switch, is placed at an upper position of the slot cover 201 on the side face of the camera body 10. For this reason, the eject switch 202 is not allowed to shift together with the slot cover 201.

FIG. 13 shows the state of the cover-position detection switch 203 in the digital camera 1B. The cover-position detection switch 203 is constituted by a cover contact 203a connected to the slot cover 201 and body contacts 203b and 203c fixed to the camera body 10 by using a holding mechanism, not shown, and depending on the position of the slot cover 201, switching is performed among states in which the cover contact 203a is connected to either the body contact 203b or 203c, or in which it is connected to none of the body contacts 203b and 203c.

Thus, the position of the slot cover 201 (any one of the positions shown in FIGS. 12A to 12C) can be detected.

The accessing control of the CPU 100 to the card-type medium 112 attached to the card slots 18a and 18b is carried out in the same manner as that of the first preferred embodiment. In other words, the CPU 100 always recognizes the position of the slot cover 201 through the cover-position detection switch 203, and controlls process so as to inhibit access to the card-type medium 112 attached to the card slot whose opening is exposed to outside. In contrast, the CPU 100 allows access only to the card-type medium 112 attached to the card slot covered with the slot cover 201.

FIG. 14 shows ejection mechanisms with a driving mechanism in accordance with the second preferred embodiment. As illustrated in the Figure, a rack 2041 is placed on the side of each of eject levers 204a and 204b that are the same as the eject lever 131 of the first preferred embodiment. Motors 205a and 205b are placed in association with the respective card slots 18a and 18b, and the eject levers 204a and 204b are driven in cooperation with the driving shafts 2051 of the motors 205a and 205b through multi-step gears 206a, 207a and 206b, 207b that engage the racks 2041. Both of the motors 205a and 205b are respectively connected to the CPU 100, and driven independently by the control by the CPU 100. Therefore, as will be described later, the CPU 100 selectively controls the motor 205a or 205b so that the card-type medium 112 attached to the card slot 18a or 18b is selectively removed therefrom.

Figure 15:
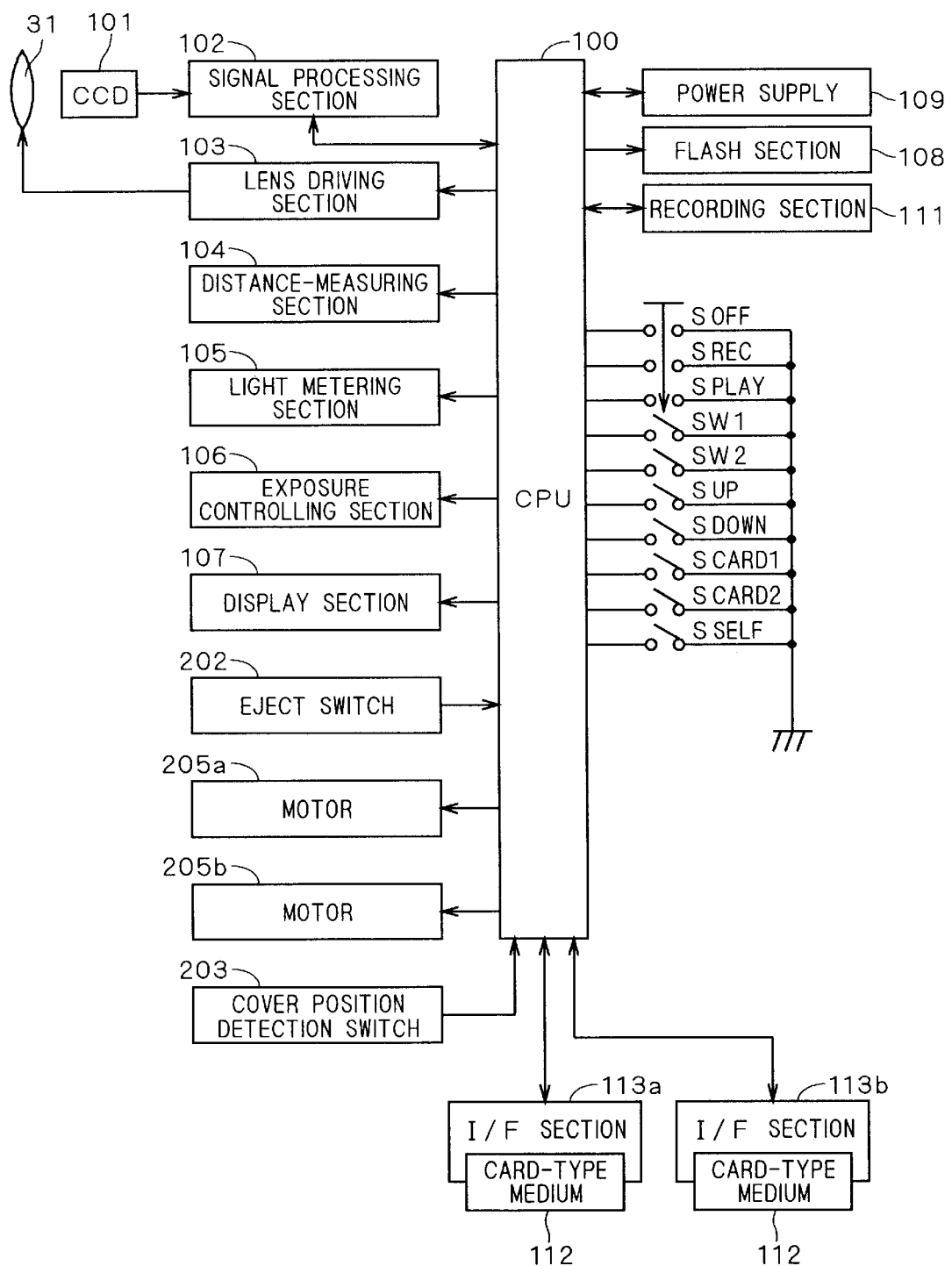
FIG. 15 is a block diagram that shows functional components of the digital camera.

FIG. 15 is a block diagram that shows functional components of the digital camera in accordance with the second preferred embodiment. The internal components of the digital camera 1B in accordance with the second preferred embodiment is basically the same as that of the digital camera 1A in accordance with the first preferred embodiment; however, the second preferred embodiment is not provided with the cover-position detection sensor, and in place of this, is provided with the eject switch 202 electrically connected to the CPU 100, the motors 205a, 205b and the cover-position detection switch 203. The ejection mechanism is controlled as described below by the CPU 100.

Figure 16:
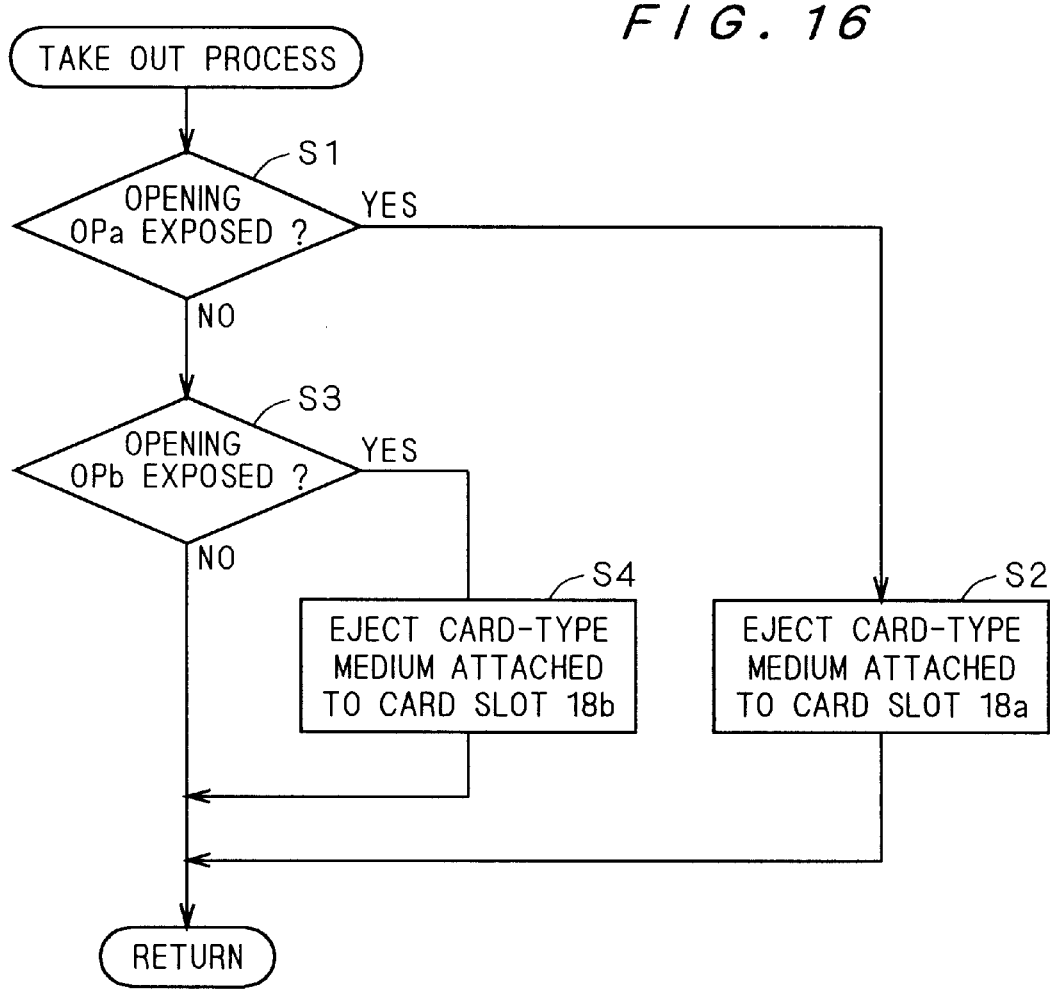
FIG. 16 is a flow chart showing a controlling sequence of ejection processes of a card-type medium.

FIG. 16 shows a controlling sequence of the ejection process of the card-type medium 112.

First, based upon a signal supplied by the cover-position detection switch 203, the CPU 100 discriminates whether or not the slot cover 201 is located at a position where the opening OPa is exposed (Step S1). In the case when it is discriminated that the slot cover 201 is located at the position where the opening OPa of the card slot 18a (and a card-type medium 112 inserted therein) is exposed (FIG. 12C), the motor 205a is driven to eject the card-type medium 112 from the card slot 18a (Step S2). In contrast, at step S1, if it is discriminated that the slot cover 201 is located at the position where the opening OPa of the card slot 18a (and a card-type medium 112 inserted therein) is not exposed; then it is discriminated whether or not the slot cover 201 is located at a position where the opening OPb is exposed (Step S3). In the case when it is discriminated that the slot cover 201 is located at the position where the opening OPb of the card slot 18b (and a card-type medium 112 inserted therein) is exposed (FIG. 12A), the motor 205b is driven to eject the card-type medium 112 from the card slot 18b (Step S4). At step S3, if it is discriminated that the slot cover 201 is located at the position where the opening OPb of the card slot 18b is not exposed (FIG. 12B); then the sequence is complete without carrying out the ejecting.

In this manner, in the second preferred embodiment, the card slot whose opening is exposed is electrically sensed so that the card-type medium 112 inserted therein is selectively ejected. As described earlier, since the CPU 100 is not allowed to access the card-type medium 112 attached to the card slot whose opening is exposed, it is possible to prevent the CPU 100 from ejecting the card-type medium 112 that the CPU is currently accessing.

In accordance with the second preferred embodiment having the above-mentioned arrangement, the same effects as the first preferred embodiment are obtained, and since the cover-position detection switch 203 is provided for detecting the position of the slot cover 201, it is possible for the CPU 100 of the digital camera 1B which is an electronic device to confirm the card slot whose opening is exposed, and the digital camera 1B is not allowed to access the card-type medium 112 attached to the corresponding card slot. Thus, the CPU 100 is prevented from erroneously ejecting the card-type medium 112 which is currently accessed, damages to hardware and software is avoided, and it is possible to provide a safer device.

Moreover, in accordance with an instruction from the eject switch 202 for designating ejection, based upon the position of the slot cover 201 detected by the cover-position detection switch 203, it is discriminated whether the opening of the card slot is exposed, and the ejection mechanism corresponding to the card slot, which includes the eject lever 204a or 204b, the driving-force transmitting member 132, the eject lever 133, the rotation shaft 134, the card pushing member 135, the motor 205a or 205b and the gears 206a, 207a or 206b, 207b, is operated. Since it is not necessary to provide an eject switch 202 for each of a plurality of card slots, the production costs can be reduced.

3. Third Preferred Embodiment

Figure 17A:
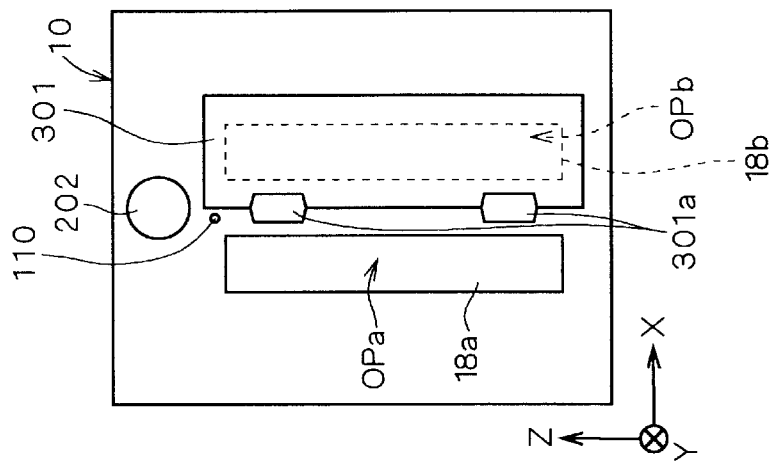
FIGS. 17A to 17C are drawings that show states of shifts of the slot cover in the digital camera in accordance with the third preferred embodiment.
Figure 17B:
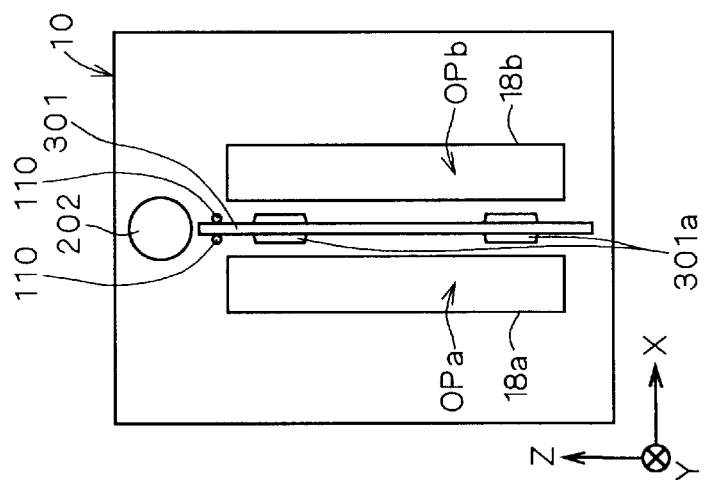
Figure 17C:
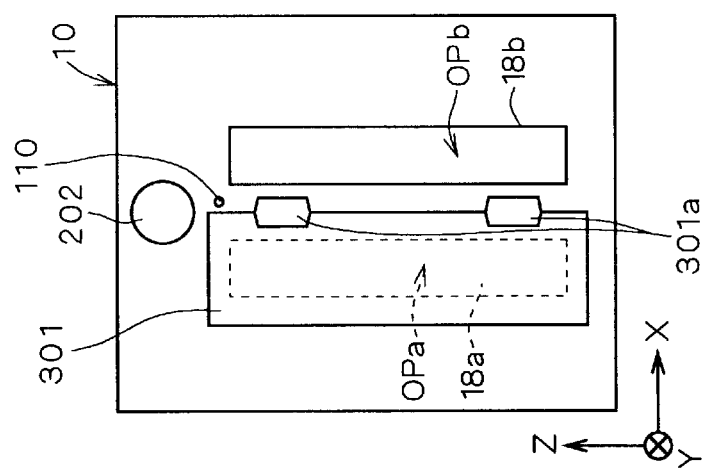

FIGS. 17A to 17C are drawings which show states of shifts of a slot cover 301 in a digital camera 1C (see FIGS. 1 and 2) in accordance with the third preferred embodiment. As illustrated in FIGS. 17A to 17C, in the same manner as the first and second preferred embodiments, the digital camera 1C of the third preferred embodiment is also provided with openings OPa and OPb (forming opening arrangement) that are placed on a side face of the camera body 10, and card slots 18a and 18b are fixed inside thereof, however, in the digital camera 1C, the slot cover 301 is not of a sliding type, but of a hinge type. The slot cover 301 is placed between the opening OPa of the card slot 18a and the opening OPb of the card slot 18b by using a hinge 301a as a pivotal cover placed so as to be freely pivot centered on the Z-axis direction as a rotating shaft.

In other words, switching is performed between states in which as illustrated in FIG. 17A, the slot cover 301 is located on the X-axis negative side so as to cover the opening OPa of the card slot 18a, and in which as illustrated in FIG. 17C, the slot cover 301 is located on the X-axis positive side so as to cover the opening OPb of the card slot 18b. FIG. 17B shows a state in the middle of the switching between FIG. 17A and FIG. 17C, that is, a state in which, from the state of FIG. 17A or FIG. 17C, the slot cover 301 is opened (allowed to pivot) so that the slot cover 301 is perpendicular to the camera body 10 (a state in parallel with the Y-Z plane). In this manner, in the case of the slot cover 301 of the third preferred embodiment also, as a result of the pivotal movement, it is also allowed to shift in the X-axis positive or negative direction that is the arrangement direction of the openings OPa and OPb.

As clearly shown in FIG. 17B, two cover-position sensors 110, are placed on both of the sides of the slot cover 301. The two cover-position sensors 110 are push-in switches, and based upon the ON-OFF signals thereof, the CPU 100 detects whether the slot cover 301 is in the state of FIG. 17A or FIG. 17C. A lock mechanism (not shown) is provided so as to fix the cover at the respective states of FIG. 17A and FIG. 17C.

An eject switch 202, which is the same as that of the second preferred embodiment and which is connected to the CPU 100, is placed above the slot cover 301. Although not shown in the Figures, ejection mechanisms containing two motors that are the same as those of the second preferred embodiment, are constructed in the two card slots 18a and 18b inside the camera body 10. The motors are connected to the CPU 100 in the same manner as the second preferred embodiment, and the other components are the same as those of the second preferred embodiment.

With this components as in the second preferred embodiment, when the user presses the eject switch 202 down, the CPU 100 detects the position of the slot cover 301, and drives either of the motors to eject the card-type medium 112 in the card slot 18a or 18b whose opening is exposed.

In accordance with the third preferred embodiment having the above-mentioned components, it is possible to obtain the same effects as the second preferred embodiment.

Here, in the third preferred embodiment, as illustrated in FIG. 17B, both of the openings OPa and OPb can be exposed. In this state, upon operation of the eject switch 202, the card-type medium 112, inserted in the card slots 18a and 18b, may be simultaneously ejected, or none of them may be ejected.

4. Fourth Preferred Embodiment

Figure 18C:
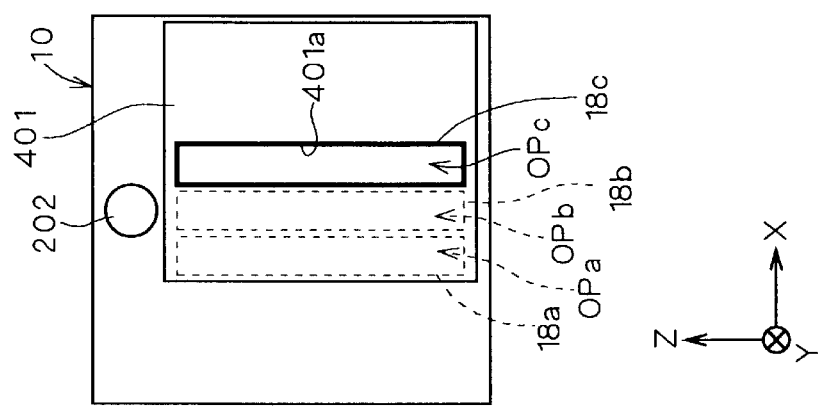
FIGS. 18A to 18C are drawings that show states of shifts of the slot cover in the digital camera in accordance with the fourth preferred embodiment.
Figure 18B:
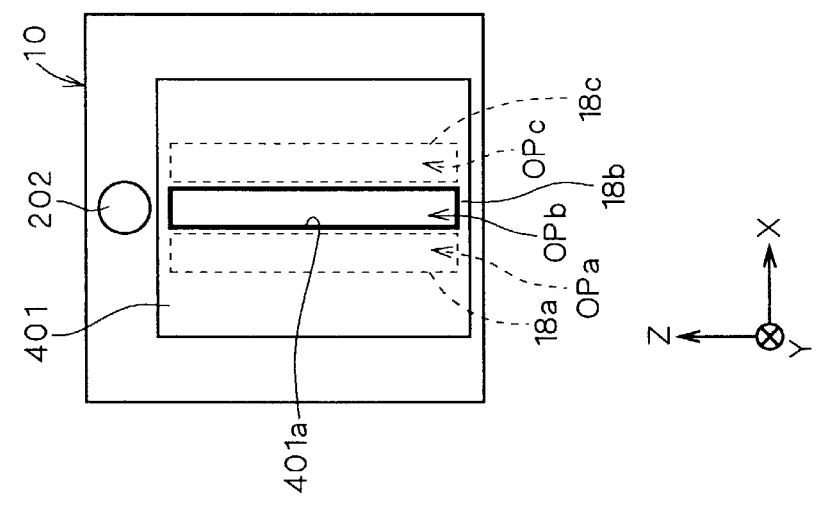
Figure 18A:
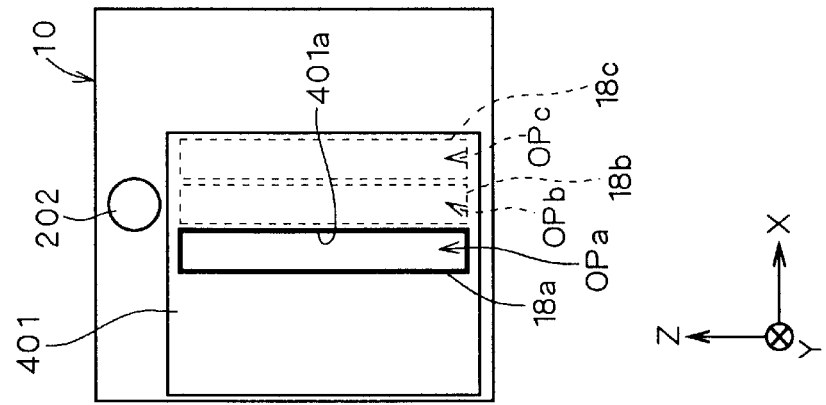

FIGS. 18A to 18C are drawings which show states of shifts of a slot cover 401 in a digital camera ID (see FIGS. 1 and 2) in accordance with the fourth preferred embodiment. In the digital camera ID of the fourth preferred embodiment, on the side face and inside the camera body 10, there are three openings OPa, OPb and OPc (forming an opening arrangement) and the corresponding card slots 18a, 18b and 18c, which have the same relation as the openings OPa and OPb and the corresponding card slots 18a and 18b of the first preferred embodiment. The slot cover 401 has a size covering all the openings OPa, OPb and OPc corresponding to the three card slots 18a, 18b and 18c, and in the center of the slot cover 401, an opening 401a having a size that is substantially the same as the opening of one card slot is formed. The slot cover 401 is of a sliding type, and allowed to slide (move) in the X-axis positive and negative directions that is the arrangement direction of the openings OPa to OPc as in the case of the second preferred embodiment.

Although not shown in the Figures, the digital camera ID also has the same sliding mechanism as the sliding mechanism of the slot cover in the first preferred embodiment, and as illustrated in FIGS. 18A to 18C, the slot cover 401 is allowed to shift to positions at which the opening 401a almost overlaps any one of the openings OPa, OPb and OPc of the respective card slots 18a, 18b and 18c. In other words, the slot cover 401 can be located in any one of three states, that is, a state where the slot cover 401 is positioned on the X-axis negative side (FIG. 18A), a state where the slot cover 401 is positioned in the center (FIG. 18B) and a state where the slot cover 401 is positioned on the X-axis positive side (FIG. 18C).

An eject switch 202, which is the same as that of the second preferred embodiment, is placed above the slot cover 401 on the side face of the camera body 10.

FIG. 19 is a drawing that shows the state of a cover-position detection switch 402 in the digital camera ID in accordance with the fourth preferred embodiment. In the same manner as the digital camera 1B of the second preferred embodiment, the digital camera ID of the fourth preferred embodiment is provided with a cover-position detection switch 402 for detecting the position of the slot cover 401. The cover-position detection switch 402 has a cover contact 402a and body contacts 402b and 402c that have the same components as the cover contact 203a and the body contacts 203b and 203c in the second preferred embodiment. The body contact 402b and the body contact 402c are placed with a predetermined distance in the shifting direction (X-axis direction) of the slot cover 401, and when the slot cover 401 is positioned on the X-axis negative side (FIG. 18A), the cover contact 402a is allowed to conduct to the body contact 402b. When the slot cover 401 is positioned in the center (FIG. 18B), the cover contact 402a is not allowed to conduct to any of the body contacts. When the slot cover 401 is position on the X-axis positive side (FIG. 18C), the cover contact 402a is allowed to conduct to the body contact 402c. Thus, based upon the states of conduct of the respective body contacts 402b and 402c, the CPU 100 detects the position of the slot cover 401.

Moreover, each of the card slots 18a, 18b and 18c of the digital camera ID is provided with the same ejection mechanism having a motor as the ejection mechanism of the second preferred embodiment, and when the user presses the eject switch 202 down, based upon the detected position of the slot cover 401, the CPU 100 controls driving any of the motors to selectively eject the card-type medium 112 in the corresponding card slot. The other structures are the same as those of the second preferred embodiment.

In accordance with the fourth preferred embodiment having the above-mentioned components, the same effects as the second preferred embodiment are obtained with respect to the three card slots 18a, 18b and 18c.

5. Fifth Preferred Embodiment

FIGS. 20A and 20B are drawings which show states of shifts of a slot cover 501 in a digital camera 1E (see FIGS. 1 and 2) in accordance with the fifth preferred embodiment. In the same manner as the fourth preferred embodiment, the digital camera 1E of the fifth preferred embodiment is provided with three openings OPa, OPb and OPc (forming an opening arrangement) and the corresponding card slots 18a, 18b and 18c.

The size of the slot cover 501 is sufficient to cover all the three openings OPa, OPb and OPc, and the slot cover 501 is of a sliding type having the same sliding mechanism as the first preferred embodiment, and also allowed to slide (move) in the X-axis positive and negative directions that is the arrangement direction of the openings OPa to OPc as in the fourth preferred embodiment. However, an opening 501a, formed in the slot cover 501, has a size that almost covers the adjacent two openings of the card slots, and among the three openings OPa, OPb and OPc, the openings OPa and OPb corresponding to the card slots 18a and 18b or the openings OPb and OPc corresponding to the card slots 18b and 18c are selectively exposed.

In the same manner as the first preferred embodiment, the digital camera 1E is provided with a guide plate (not shown) which is connected to the slot cover 501, and the guide plate is allowed to shift in the X-axis positive and negative directions together with the slot cover 501 on the bottom face of the camera body 10. In association with the arrangement in which the slot cover 501 allows the openings corresponding to the two of card slots to be exposed, two eject buttons 123, which are the same as that of the first preferred embodiment, are placed at positions corresponding to the opening 501a of the slot cover 501 of the guide plate.

Accordingly, each of the card slots 18a, 18b and 18c is provided with the same ejection mechanism as the first preferred embodiment. When the user presses either of the two eject buttons 123 or both of them, either of the card-type medium 112 attached to the exposed two card slots, or both of them, can be ejected. The other components are the same as those of the fourth preferred embodiment.

As clearly shown by FIGS. 20A and 20B, in the digital camera 1E, the opening OPb of the card slot 18b in the center is always exposed. The card-type medium 112, attached to the card slot 18b in the center, is always supplied with power independent of the position of the slot cover 501 so that it can be accessed by the CPU 100 at any time. With respect to the card slots 18a and 18c, in the same manner as the first to fourth preferred embodiments, when the openings OPa or OPc is exposed, the CPU 100 is allowed to access the card-type medium 112 attached to the corresponding card slot, and when, in contrast, they are covered, the CPU 100 is inhibited to access the card-type medium 112.

Even in the case of attaching a card-type medium 112 which has a protruding portion from the opening while being inserted to the card slot, such as a modem card with a cable, the card slot 18b in the center is used so that such a card-type medium 112 having a protruding portion from the opening of the card slot can be attached, and the slot cover 501 can be shifted with such a card-type medium 112 being inserted, thereby making it possible to improve the operability.

In accordance with the fifth preferred embodiment having the above-mentioned components, the card slots 118a and 18c provide the same effects as the fourth preferred embodiment.

Moreover, the opening 501a of the slot cover 501 has a size covering the openings of two card slots; therefore, with respect to the three card slots, card-type medium 112 can be detachably attached to two of the card slots without shifting the slot cover 501. It is possible to improve the operability.

6. Modified Example

Although the above-mentioned preferred embodiments have exemplified electronic devices, the preferred embodiments are not intended to be limited thereby.

Figure 21:
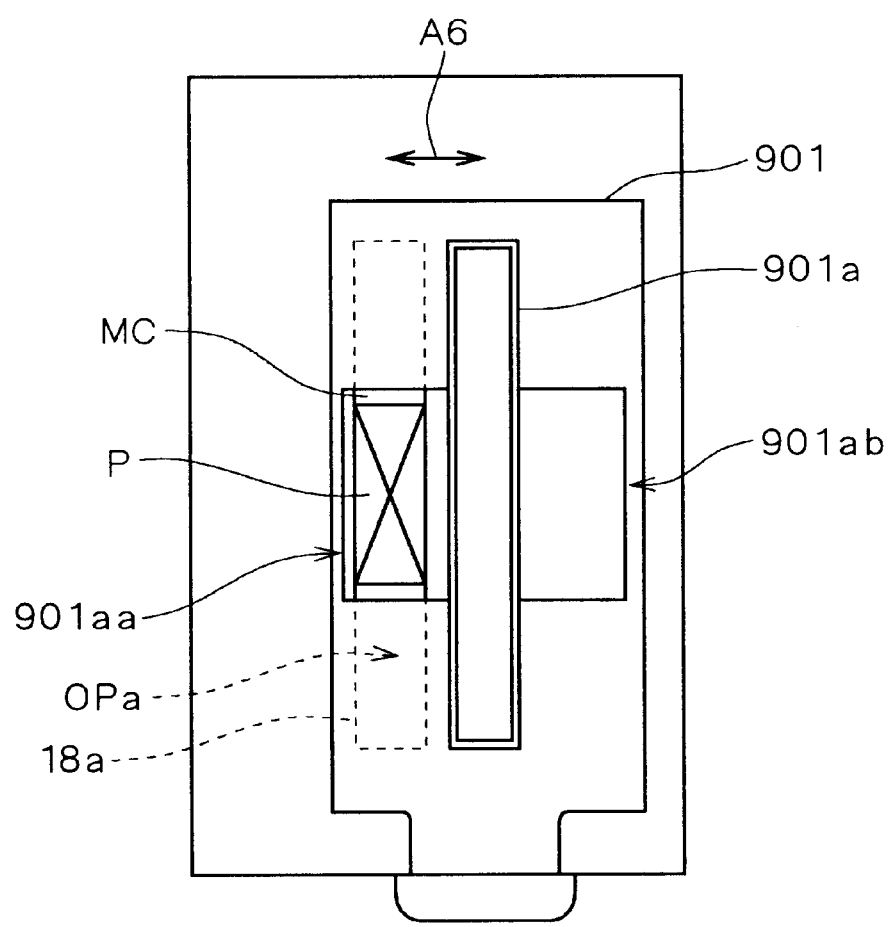
FIG. 21 shows a modified example of the slot cover.

In the above-mentioned preferred embodiments, the slot cover entirely covers at least one card slot which can be accessed by the CPU; however, another arrangement may be used in which one portion of the opening of the corresponding card slot is covered to such an extent that an accessible card is not pulled out. FIG. 21 shows a modified example of such a slot cover. As illustrated in FIG. 21, cut-out sections 901aa and 901ab are formed in the X-axis positive and negative directions beside an opening 901a of a slot cover 901. With respect to a modem card MC which is accessible and attached to the card slot 18a in a state so as not to be pulled out, the opening OPa of the card slot 18a can be covered while a protruding portion P such as a cable thereof is exposed to outside through the cut-out section, and even in this state, the slot cover 901 can be shifted in the direction of arrow A6.

In the above-mentioned first to fourth preferred embodiments, any card-type medium attached to a card slot whose opening (opening area) is exposed is controlled to be inaccessible; however, this may be controlled to be accessible. In this case, any card-type medium having a protruding portion from the opening of a card slot (opening area), such as a modem with a cable, can be attached to a card slot whose opening (opening area) is exposed, and used therein. Moreover, the user may make a selection between the control method of this type and the control method described in the first to fourth preferred embodiments.

In the above-mentioned preferred embodiments, the openings are placed on the side face of the camera body as a portion accessible from outside; however, these are not necessarily placed on an outer surface of the body. For example, an opening may be placed in a recessed section that can be reached from outside.

In the above-mentioned preferred embodiments, two or three card slots having the same structure are provided as media attaching sections to which memory cards of the same type can be inserted and used therein; however, card slots having different sizes, lengths of the inlets, etc. and the corresponding card reading mechanisms may be provided so as to allow memory cards of different types (for example, compact flash and smart media) to be attached thereto.

Figure 22:
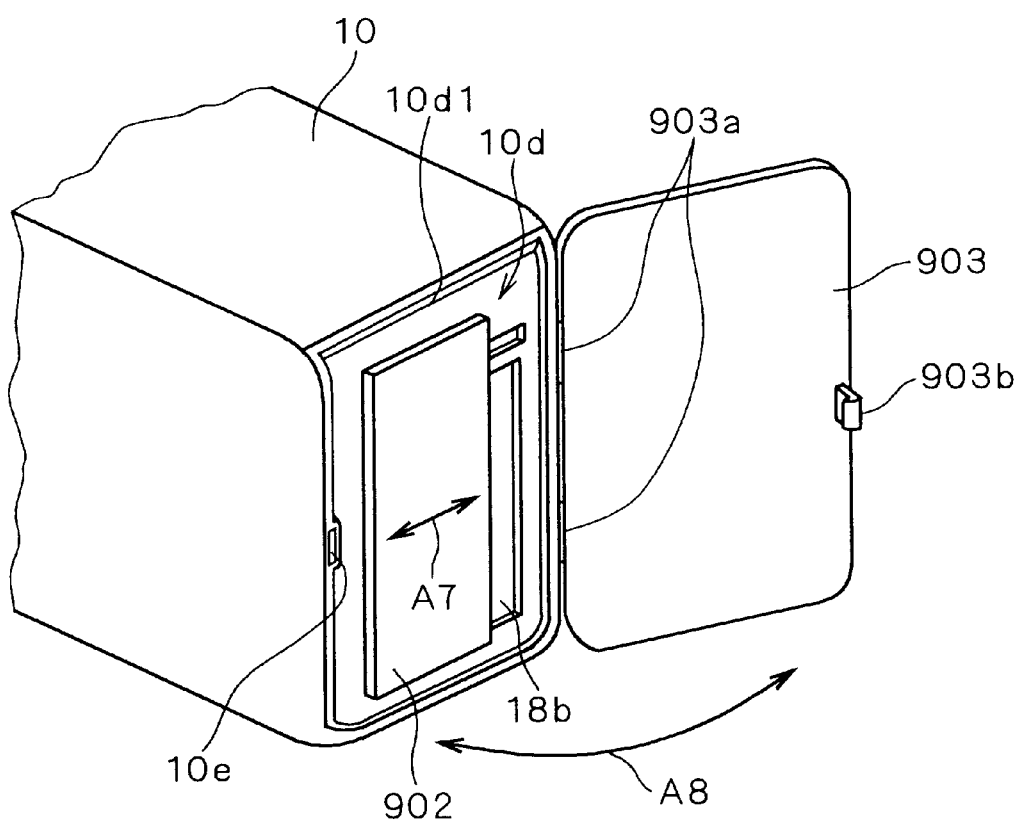
FIG. 22 is a perspective view that shows a modified example of an electronic camera having double covers.

In the above-mentioned preferred embodiments, only one slot cover is used; however, double covers may be placed. FIG. 22 is a perspective view that shows a modified example of an electronic camera having double covers. In this modified example, a recessed section 10d is formed on a side face of the camera body 10, and card slots 18a (not shown) and 18b that are the same as those of the first preferred embodiment are placed in the recessed section 10d. Further, an outer cover 903 is placed to cover the recessed section 10d, with an inner cover 902 being placed inside the recessed section 10d.

Among these components, the inner cover 902 has the same shifting mechanism as the slot cover in the first preferred embodiment, and is allowed to slide in the direction of arrow A7. The inner cover 902 selectively exposes either of the two card slots 18a and 18b. The outer cover 903 has a hinge 903a on its side edge, and the outer cover 903 is attached to the camera body 10 so as to freely pivot in the direction of arrow A8. A stopper 903b is fixed to the other side edge of the outer cover 903, and at a position on the side face of the camera body 10 corresponding to the stopper 903b, a hole 10e in which the stopper 903b is inserted and stopped is formed; thus, the outer cover 903 is locked when the stopper 903b is engaged by the hole 10e.

With these components, at the time of attaching a memory card, even when the inner cover 902 allows a card slot to be exposed, the card slot is not exposed to outside by closing the outer cover 903; therefore, it is possible to prevent the attached memory card from being erroneously pulled out at the time of accessing, and consequently to ensure the safety. Moreover, it is possible to prevent dust, etc. from entering the card slots.

In the above-mentioned preferred embodiments, explanations have been given of the openings OPa and OPb on the assumption that they are independent openings; however, they may be any openings as long as card media 112 are substantially inserted through them, and one opening, formed by eliminating a partition between the openings OPa and OPb corresponding to the card slots 18a and 18b, may be used. Furthermore, the card slots 18a and 18b may be provided as separate parts, or may be provided as a unit of parts.

In the above-mentioned preferred embodiments, explanations have been given by exemplifying a digital camera as an electronic device; however, the preferred embodiments are applicable to a device in which a plurality of card slots are provided and electronic data is exchanged therein, that is, for example, a personal computer, a digital video camera, etc.

While the invention has been shown and described in detail, the foregoing description is in all aspects illustrative and not restrictive. It is therefore understood that numerous other modifications and various can be devised without departing from the scope of the invention.

What is claimed is:

1. An electronic device for executing a predetermined function using electronic data, comprising:
   a plurality of medium-attaching parts to which card-shaped media can be attached through a plurality of openings, respectively, said plurality of openings being arranged on positions accessible from outside; and
   a cover member alternatively movable to a first position to selectively expose at least a first one of said plurality of openings, and said cover member being movable to a second position to selectively expose at least a second one of said plurality of openings.

2. The electronic device of claim 1, further comprising a detector for detecting a position of said cover member.

3. The electronic device of claim 1, further comprising an ejector for ejecting a card-shaped medium attached to a medium-attaching part out of said plurality of medium-attaching parts, selectively, an opening of said medium-attaching part being exposed.

4. The electronic device of claim 3, wherein
   said ejector comprises:
   a designation part for designating ejection of a card-shaped medium attached to one of said plurality of medium-attaching parts;
   a plurality of ejection mechanisms which are located at said plurality of medium-attaching parts correspondingly and eject card-shaped media attached to said plurality of medium-attaching parts, respectively; and
   a controller for determining said medium-attaching part whose opening is exposed in accordance with designation from said designation part and operating an ejection mechanism corresponding to said medium-attaching part.

5. An electronic device comprising:
   a body;
   an attaching part fixed on said body and having a first connector and a second connector, which are allowed to attach card-shaped media thereto, respectively; and
   a cover member supported on said body and being alternatively movable between a first position where a card-shaped medium is restricted to be attached to and removed from said first connector and allowed to be attached to and removed from said second connector and a second position where a card-shaped medium is restricted to be attached and removed to and from said second connector and allowed to be attached to and removed from said first connector.

6. The electronic device of claim 5, further comprising:
   a first pushing member for ejecting a card-shaped medium attached to said first connector; and
   a second pushing member for ejecting a card-shaped medium attached to said second connector, wherein
   either one of said first pushing member and said second pushing member is operable in accordance with a position of said cover member.

7. The electronic device of claim 5, further comprising a sensor for detecting a position of said cover member.

8. The electronic device of claim 7, further comprising a controller for inhibiting data transferring through said second connector when said cover member is detected being in said first position on the basis of output from said sensor.

9. The electronic device of claim 7, further comprising:
   a first pushing member for ejecting a card-shaped medium attached to said first connector;
   a second pushing member for ejecting a card-shaped medium attached to said second connector;
   a driving mechanism for driving said first pushing member and said second pushing member, selectively;
   an input part for designating ejection; and
   a controller for controlling said driving mechanism in order to drive a pushing member corresponding to a connector which a card-shaped medium is allowed to be attached to and removed from in accordance with designation from said input part.

* * * * *

UNITED STATES PATENT AND TRADEMARK OFFICE
CERTIFICATE OF CORRECTION

PATENT NO.    : 6,601,766 B2
DATED         : August 5, 2003
INVENTOR(S)   : Yoshio Nakagawa et al.

It is certified that error appears in the above-identified patent and that said Letters Patent is hereby corrected as shown below:

Title page,
After "[*] Notice: "Subject to any disclaimer, the term of this patent is extended or adjusted under 35 U.S.C. 154(b) by 0 days", delete "This patent is subject to a terminal disclaimer."

Signed and Sealed this

Fourth Day of May, 2004

JON W. DUDAS
*Acting Director of the United States Patent and Trademark Office*